US012683719B2

(12) United States Patent
Son et al.

(10) Patent No.: US 12,683,719 B2
(45) Date of Patent: Jul. 14, 2026

(54) METHOD AND APPARATUS FOR RETRANSMISSION IN SIDELINK COMMUNICATION

(71) Applicants:HYUNDAI MOTOR COMPANY, Seoul (KR); KIA CORPORATION, Seoul (KR); WONKWANG UNIVERSITY CENTER FOR INDUSTRY-ACADEMY COOPERATION, Iksan-si (KR)

(72) Inventors: Hyuk Min Son, Iksan-si (KR); Gene Back Hahn, Hwaseong-si (KR); In Yong Jung, Hwaseong-si (KR)

(73) Assignees: Hyundai Motor Company, Seoul (KR); Kia Corporation, Seoul (KR); Wonkwang University Center For Industry-Academy Cooperation, Iksan-si (KR)

( * ) Notice: Subject to any disclaimer, the term of this patent is extended or adjusted under 35 U.S.C. 154(b) by 642 days.

(21) Appl. No.: 18/015,909

(22) PCT Filed: Jul. 6, 2021

(86) PCT No.: PCT/KR2021/008593
§ 371 (c)(1),
(2) Date: Jan. 12, 2023

(87) PCT Pub. No.: WO2022/014937
PCT Pub. Date: Jan. 20, 2022

(65) Prior Publication Data
US 2023/0246747 A1 Aug. 3, 2023

Related U.S. Application Data

(60) Provisional application No. 63/053,137, filed on Jul. 17, 2020.

(51) Int. Cl.
*H04L 1/1812* (2023.01)
*H04L 1/1825* (2023.01)
(Continued)

(52) U.S. Cl.
CPC .......... *H04L 1/1825* (2013.01); *H04L 1/1896* (2013.01); *H04W 72/25* (2023.01); *H04L 1/1812* (2013.01)

(58) Field of Classification Search
CPC ... H04L 1/1825; H04L 1/1896; H04L 1/1812; H04L 1/1685; H04L 1/1822;
(Continued)

(56) References Cited

U.S. PATENT DOCUMENTS 12,120,644 B2 * 10/2024 Shin ...................... H04L 1/1887
12,261,730 B2 * 3/2025 Walk ................... H04L 27/2636
(Continued)

FOREIGN PATENT DOCUMENTS

EP            3849124  A1    7/2021
KR    10-2020-0050838  A    5/2020
(Continued)

OTHER PUBLICATIONS

International Search Report dated Oct. 13, 2021 issued in International Patent Application No. PCT/KR2021/008593 (with English translation).
(Continued)

*Primary Examiner* — Jayanti K Patel
(74) *Attorney, Agent, or Firm* — Morgan Lewis & Bockius LLP

(57) ABSTRACT

A transmitting terminal in a communication system, the transmitting terminal including a processor, and a memory storing one or more instruction executable by the processor. The transmitting terminal is configured to transmit, to a receiving terminal, first data based on a first retransmission
(Continued)

scheme; in response to a preconfigured condition being satisfied, switch a retransmission scheme from the first retransmission scheme to a second retransmission scheme; and transmit, to the receiving terminal, second data based on the second retransmission scheme. The first retransmission scheme and the second retransmission scheme are distinguished according to whether a hybrid automatic repeat request (HARD) feedback is transmitted.

18 Claims, 14 Drawing Sheets

(51) Int. Cl.

| | |
|---|---|
| *H04L 1/1867* | (2023.01) |
| *H04W 72/25* | (2023.01) |
| *H04W 92/18* | (2009.01) |

(58) Field of Classification Search
CPC .... H04L 1/1864; H04L 1/1887; H04W 72/25; H04W 28/04; H04W 92/18; H04W 72/14; H04B 17/309
See application file for complete search history.

(56) References Cited

U.S. PATENT DOCUMENTS

| | | | | |
|---|---|---|---|---|
| 12,289,724 | B2 * | 4/2025 | Su | H04L 1/0061 |
| 2020/0154404 | A1 * | 5/2020 | Göktepe | H04L 1/1812 |
| 2020/0260472 | A1 * | 8/2020 | Ganesan | H04W 4/46 |
| 2021/0075552 | A1 * | 3/2021 | Huang | H04L 1/1854 |
| 2021/0105104 | A1 * | 4/2021 | Cao | H04L 1/1861 |
| 2021/0144750 | A1 * | 5/2021 | Cao | H04W 72/0453 |
| 2021/0235328 | A1 * | 7/2021 | Hui | H04W 72/56 |
| 2022/0232620 | A1 * | 7/2022 | Lee | H04L 1/1867 |
| 2022/0353846 | A1 * | 11/2022 | Wang | H04L 1/1861 |
| 2022/0368455 | A1 * | 11/2022 | Schellmann | H04L 1/0026 |
| 2023/0231660 | A1 * | 7/2023 | Wu | H04L 1/1816 |
| | | | | 714/748 |
| 2023/0284190 | A1 * | 9/2023 | Bhamri | H04W 72/231 |
| | | | | 370/336 |
| 2025/0080282 | A1 * | 3/2025 | Suh | H04L 1/1864 |
| 2025/0089098 | A1 * | 3/2025 | Wen | H04W 74/006 |

| | | | | |
|---|---|---|---|---|
| 2025/0096942 | A1 * | 3/2025 | Khoshnevisan | H04L 1/1621 |
| 2025/0096945 | A1 * | 3/2025 | Khoshnevisan | H04L 1/1861 |
| 2025/0096947 | A1 * | 3/2025 | Wang | H04L 1/1854 |
| 2025/0096948 | A1 * | 3/2025 | Khoshnevisan | H04W 72/231 |
| 2025/0096949 | A1 * | 3/2025 | Khoshnevisan | H04L 1/1896 |
| 2025/0096955 | A1 * | 3/2025 | Zhu | H04L 1/1864 |
| 2025/0097861 | A1 * | 3/2025 | Liu | H04L 5/0055 |
| 2025/0097946 | A1 * | 3/2025 | Zorgui | H04W 72/121 |
| 2025/0097947 | A1 * | 3/2025 | Qiao | H04W 72/21 |
| 2025/0097966 | A1 * | 3/2025 | Pan | H04W 72/40 |
| 2025/0106631 | A1 * | 3/2025 | Kim | H04W 8/18 |
| 2025/0106797 | A1 * | 3/2025 | Kim | H04B 7/1851 |
| 2025/0106873 | A1 * | 3/2025 | Yu | H04W 72/566 |

FOREIGN PATENT DOCUMENTS

| | | |
|---|---|---|
| WO | 2019/032087 A1 | 2/2019 |
| WO | 2020/144261 A1 | 7/2020 |

OTHER PUBLICATIONS

S-Yu Lien, et al., "3GPP NR Sidelink Transmission Toward 5G V2X," IEEE Acess., pp. 35368-35382, Feb. 13, 2020.

Huawei, et al., "Discussion on HARQ feedback enable and disable," R2-1907416m 3GPP TSG-RAN W2G #106, May 2, 2019, pp. 1-5.

Intel Corporation, "On mixing of blind and feedback based HARQ retransmission," 3GPP TSG-RAN WG2 #110, May 22, 2020, pp. 1 and 2.

ZTE Corporation, et al., "Discussion on remaining HARQ issues," R2-2004580, 3GPP TSG-RAN WG2 #110-e, May 22, 2020, pp. 1-41.

LG Electronics, "Feature lead summary #2 for AI 7.2.4.5 Physical layer procedures for sidelink," R1-1911702 3GPP TSG-RAN WG1 #98bis, Oct. 14, 2019, pp. 1-37.

Huawei et al., "Remaining details of sidelink resource allocation mode 2," R1-2000183 3GPP TSG-RAN WG1 Meeting #100-e, Feb. 24, 2020, pp. 1-14.

Huawei et al., "Discussion on HARQ support for NR sidelink," R2-1913701 3GPP TSG-RAN WG1 #107bis, Oct. 14, 2019, pp. 1-17.

Intel Corporation, "On mixing of blind and feedback based HARQ retransmissions," R2-2005228 3GPP TSG-RAN WG2 Meeting #110, Jun. 1, 2020, pp. 1-2.

* cited by examiner

【FIG. 1】
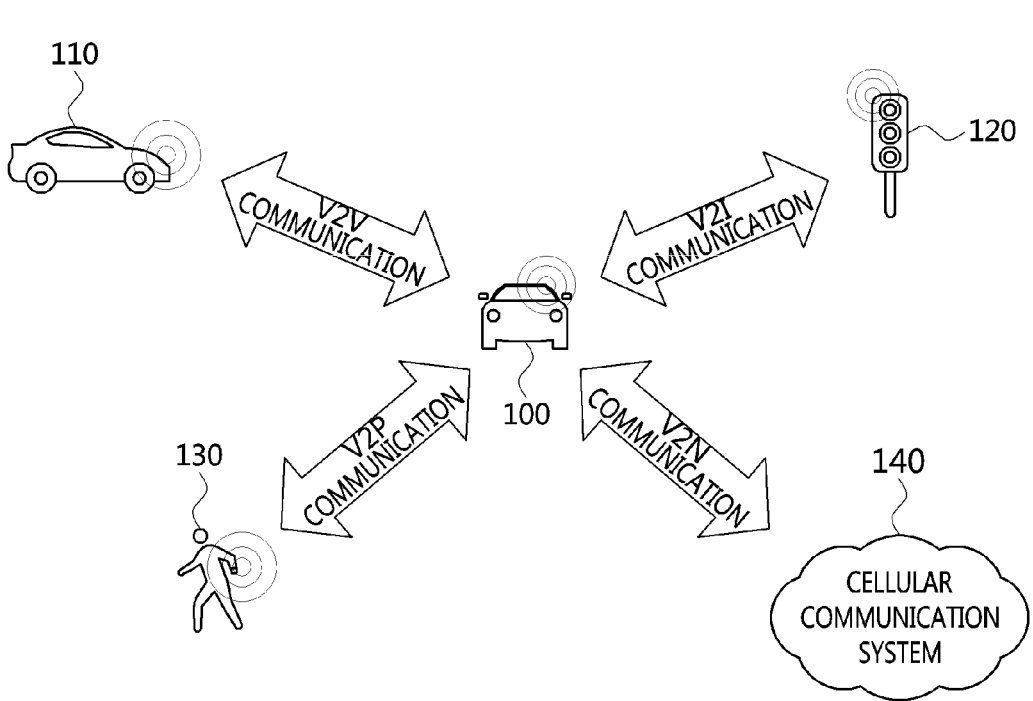

[FIG. 2]
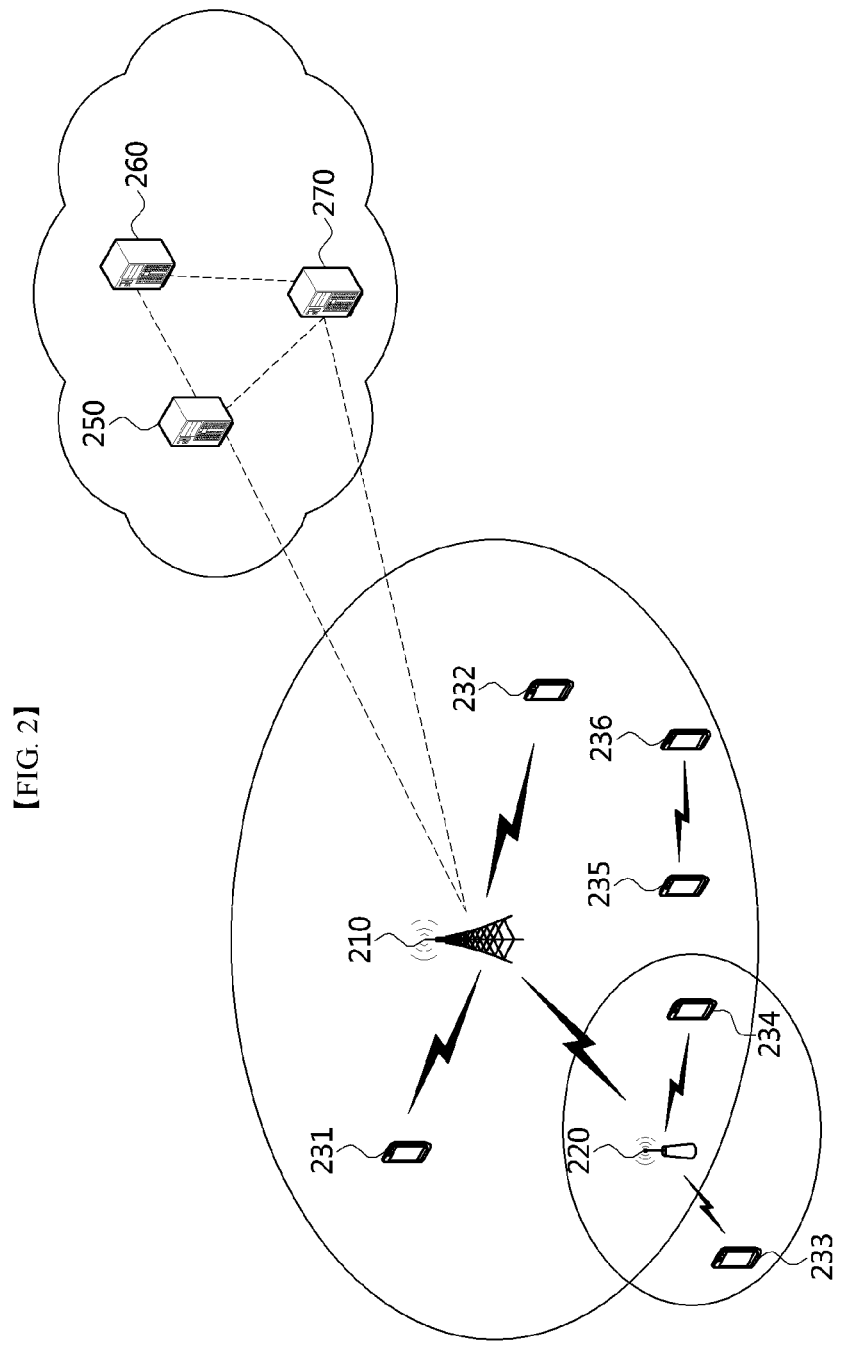

【FIG. 3】
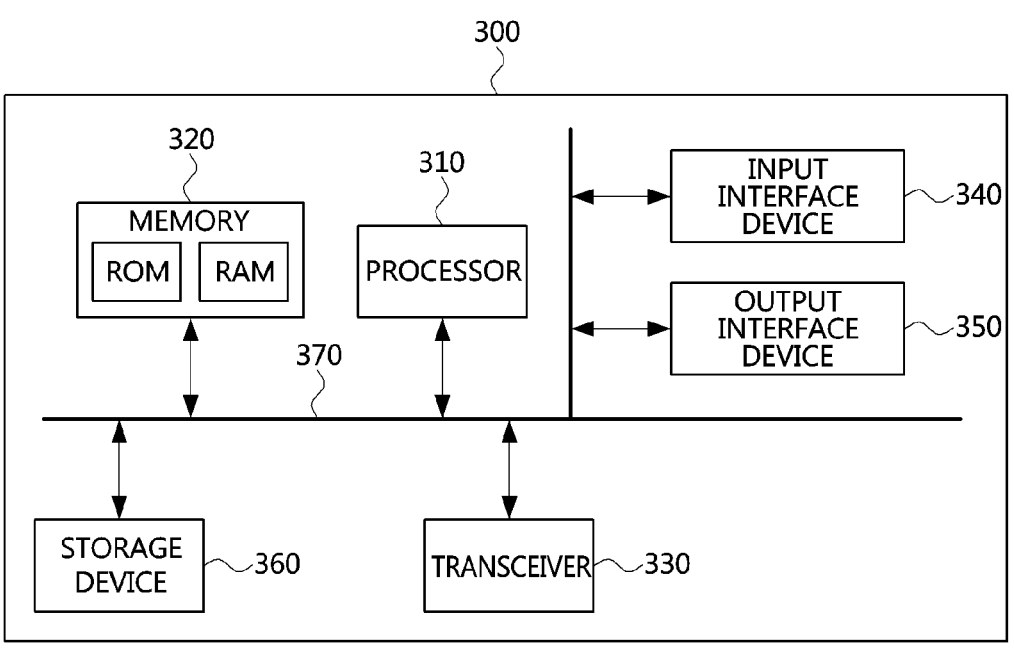
【FIG. 4】
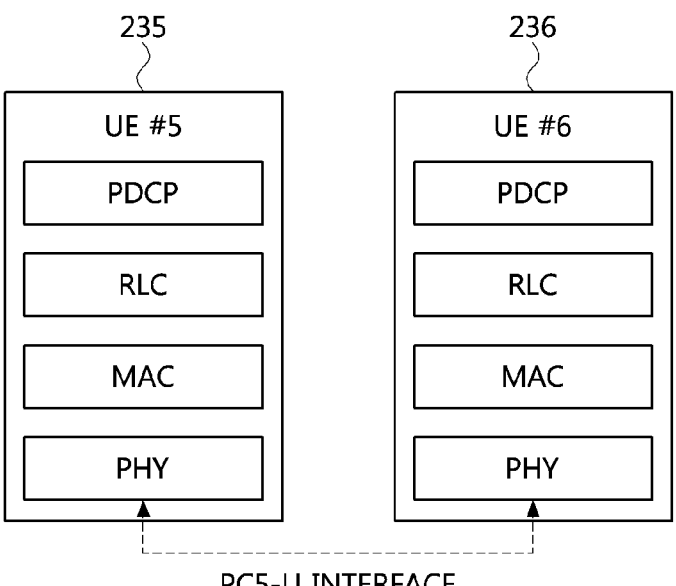

【FIG. 5】
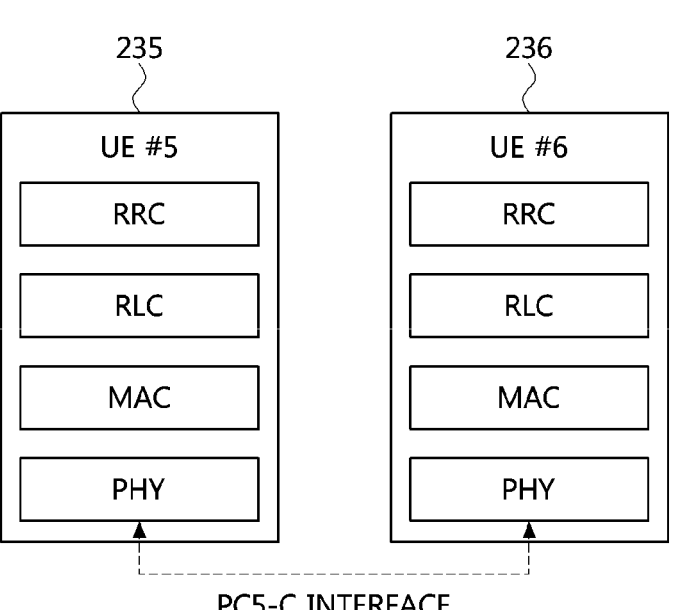
【FIG. 6】
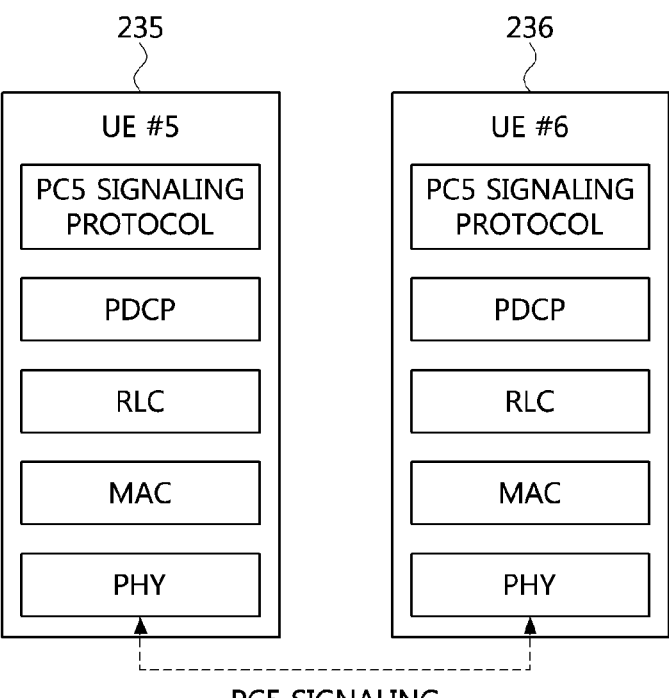

【FIG. 7】
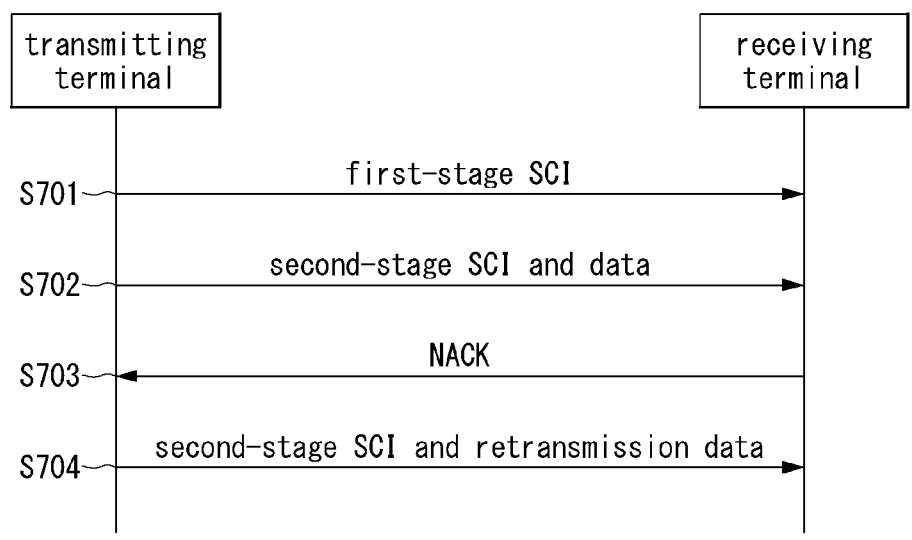
【FIG. 8】
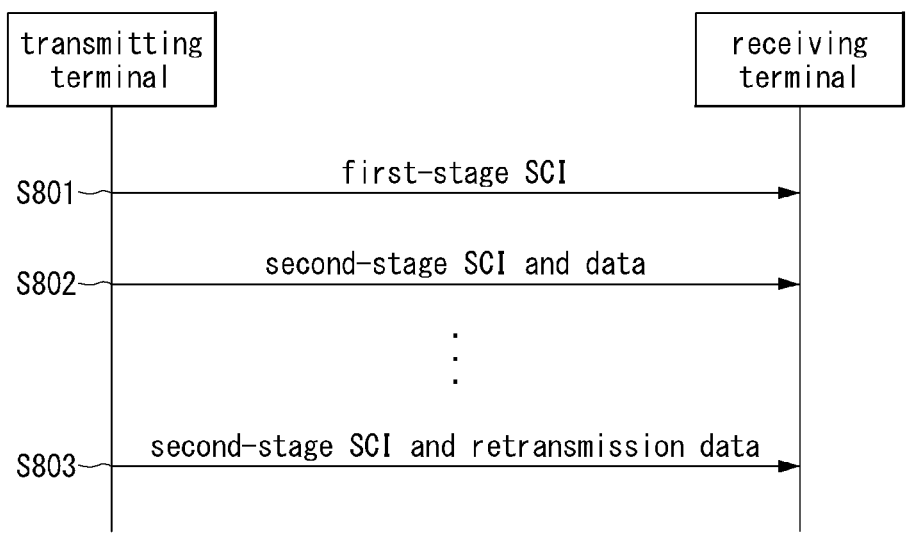

【FIG. 9】
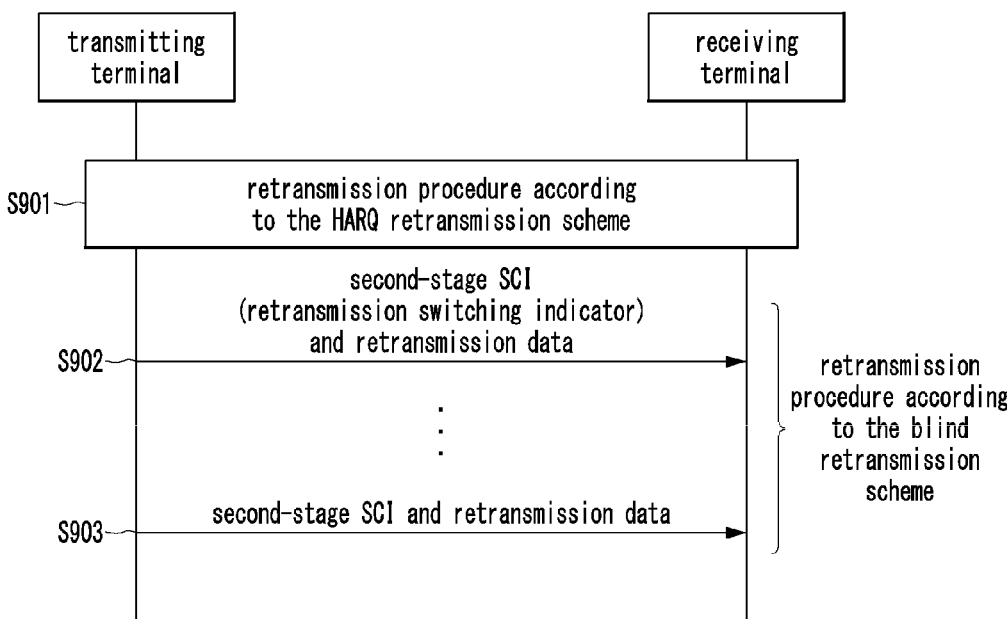
【FIG. 10】
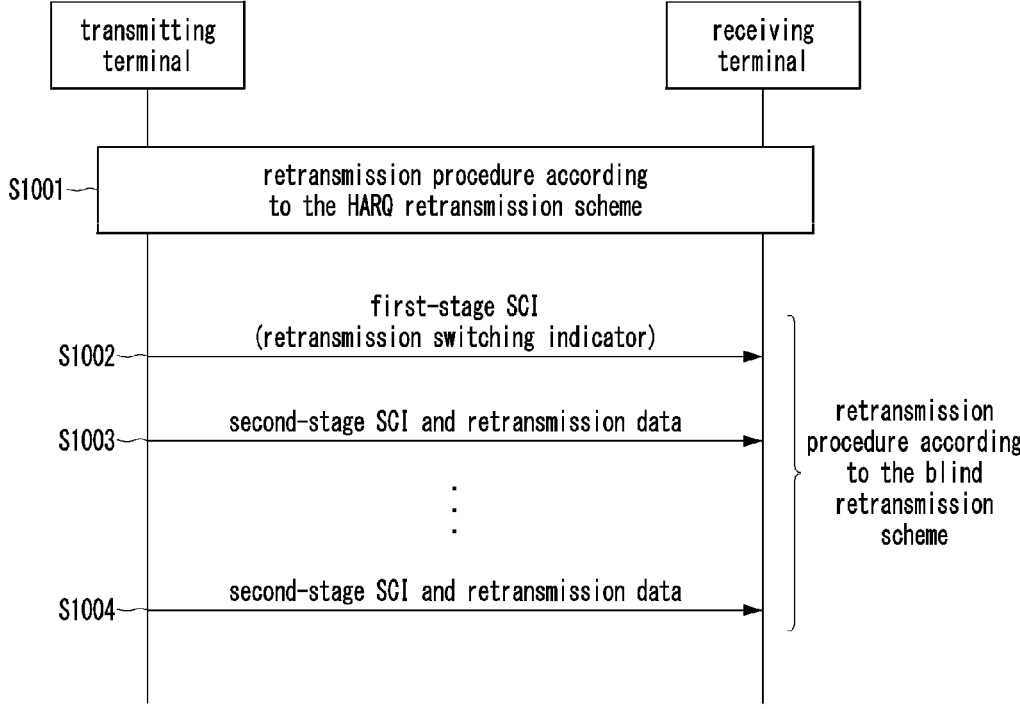

【FIG. 11】
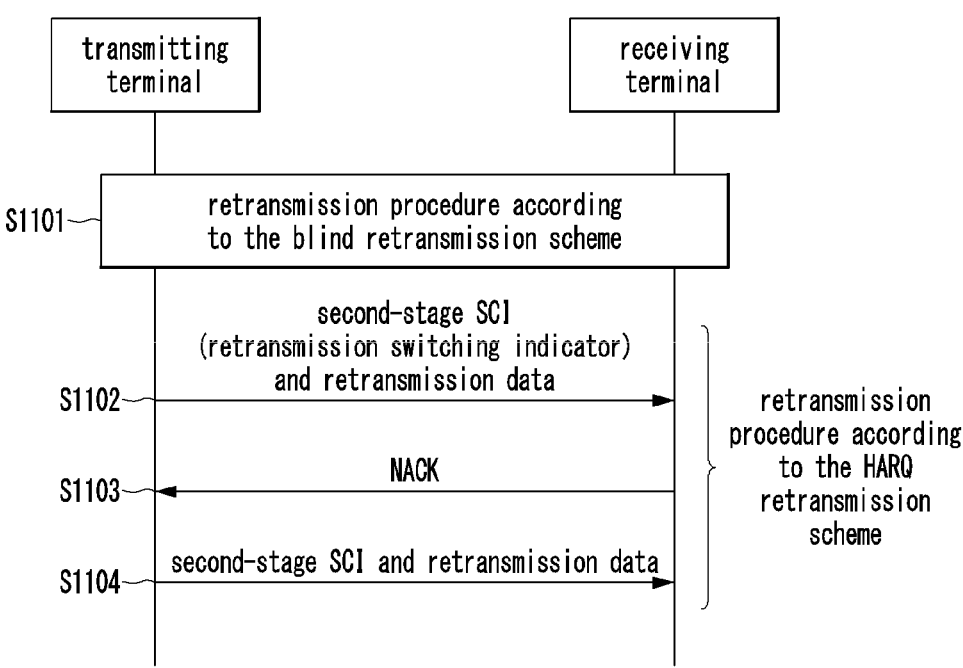

【FIG. 12】

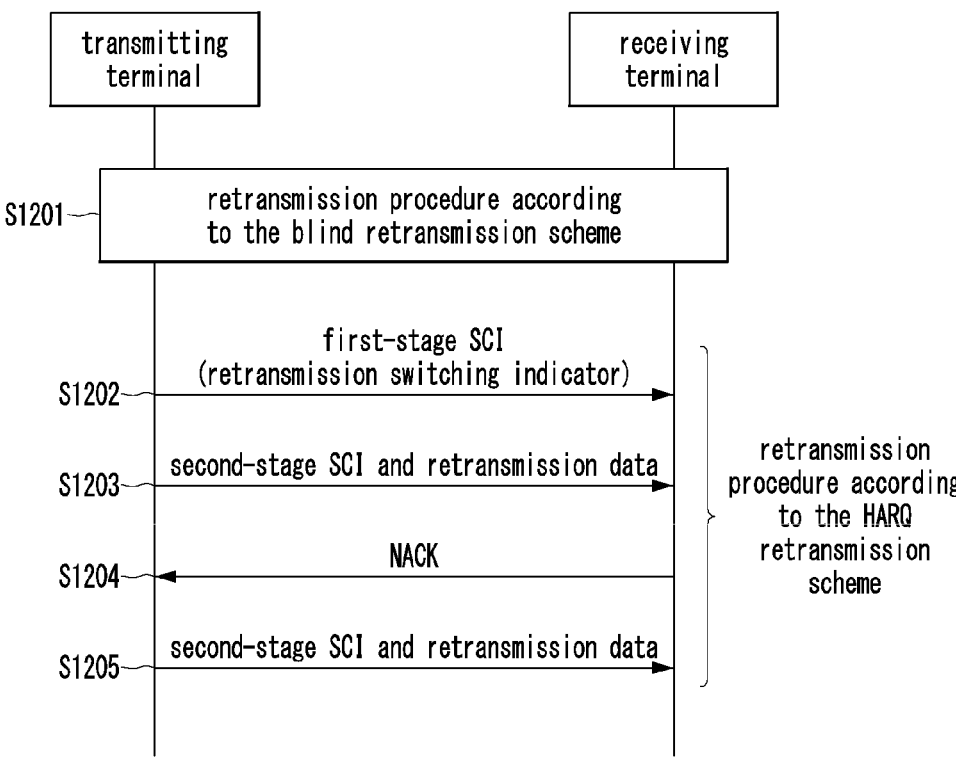

S1201 — retransmission procedure according to the blind retransmission scheme

S1202 — first-stage SCI (retransmission switching indicator)

S1203 — second-stage SCI and retransmission data

S1204 — NACK

S1205 — second-stage SCI and retransmission data retransmission procedure according to the HARQ retransmission scheme

【FIG. 13】

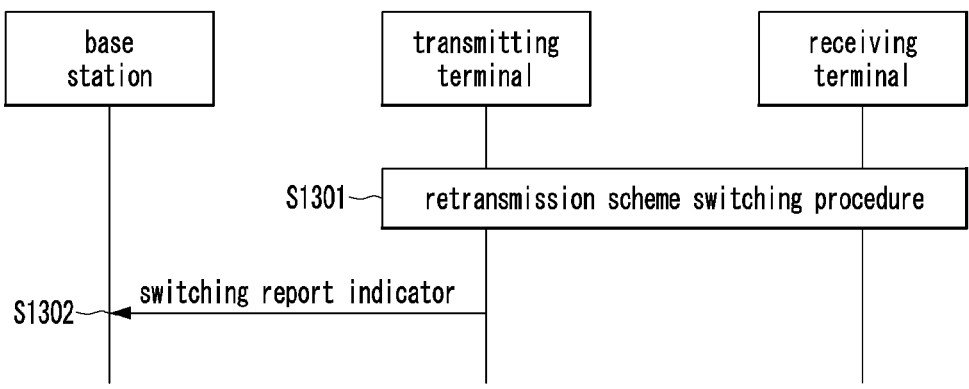

S1301 — retransmission scheme switching procedure

S1302 — switching report indicator

【FIG. 14】
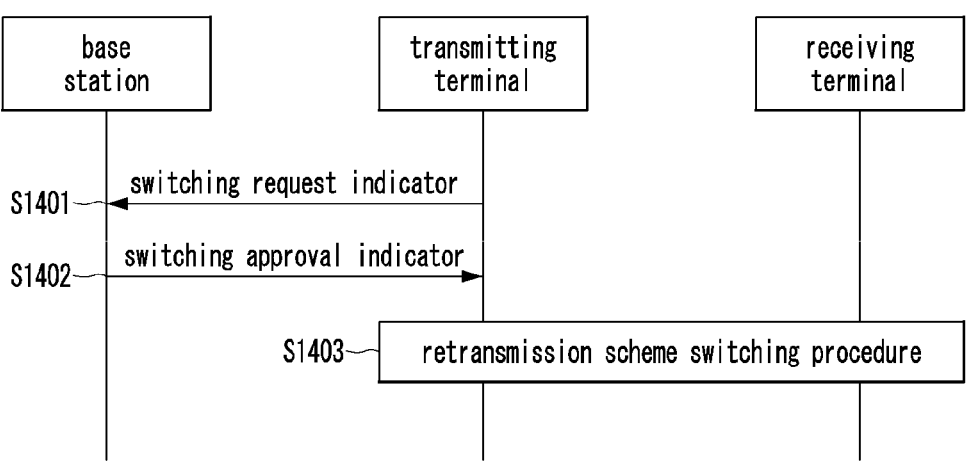

【FIG. 15】
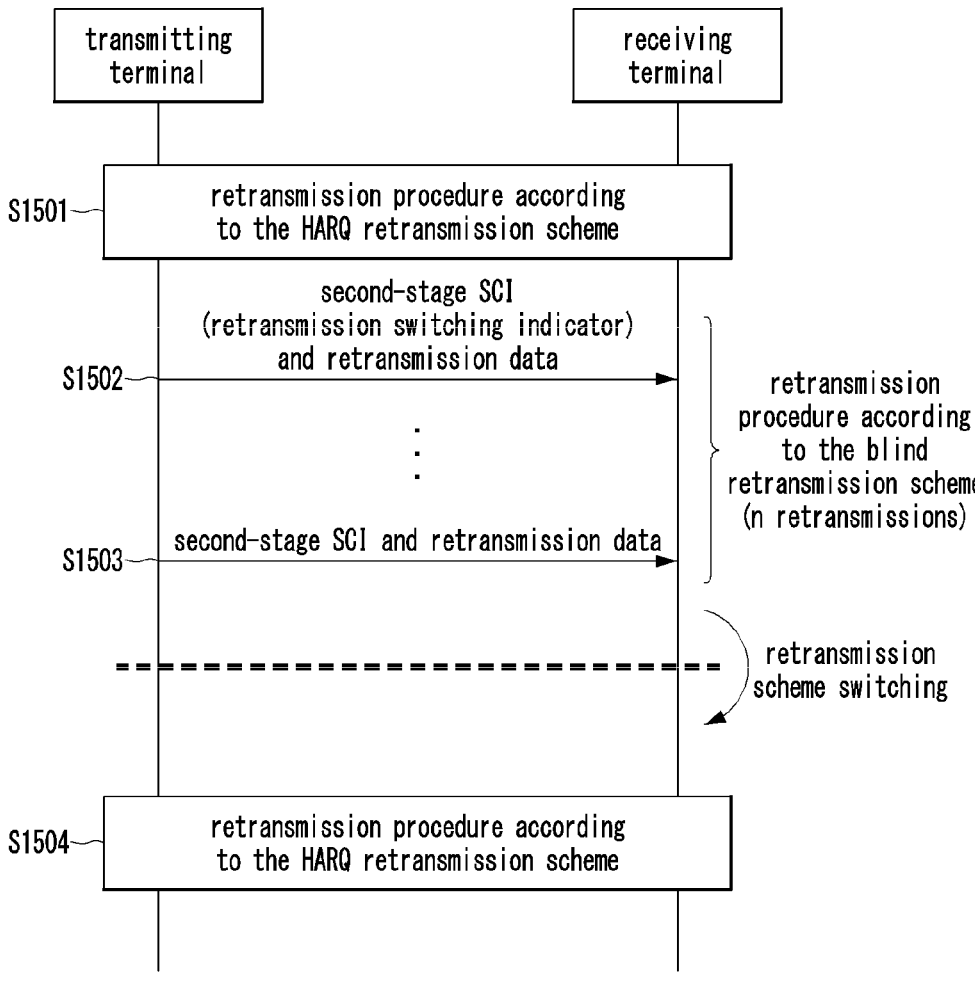

【FIG. 16】
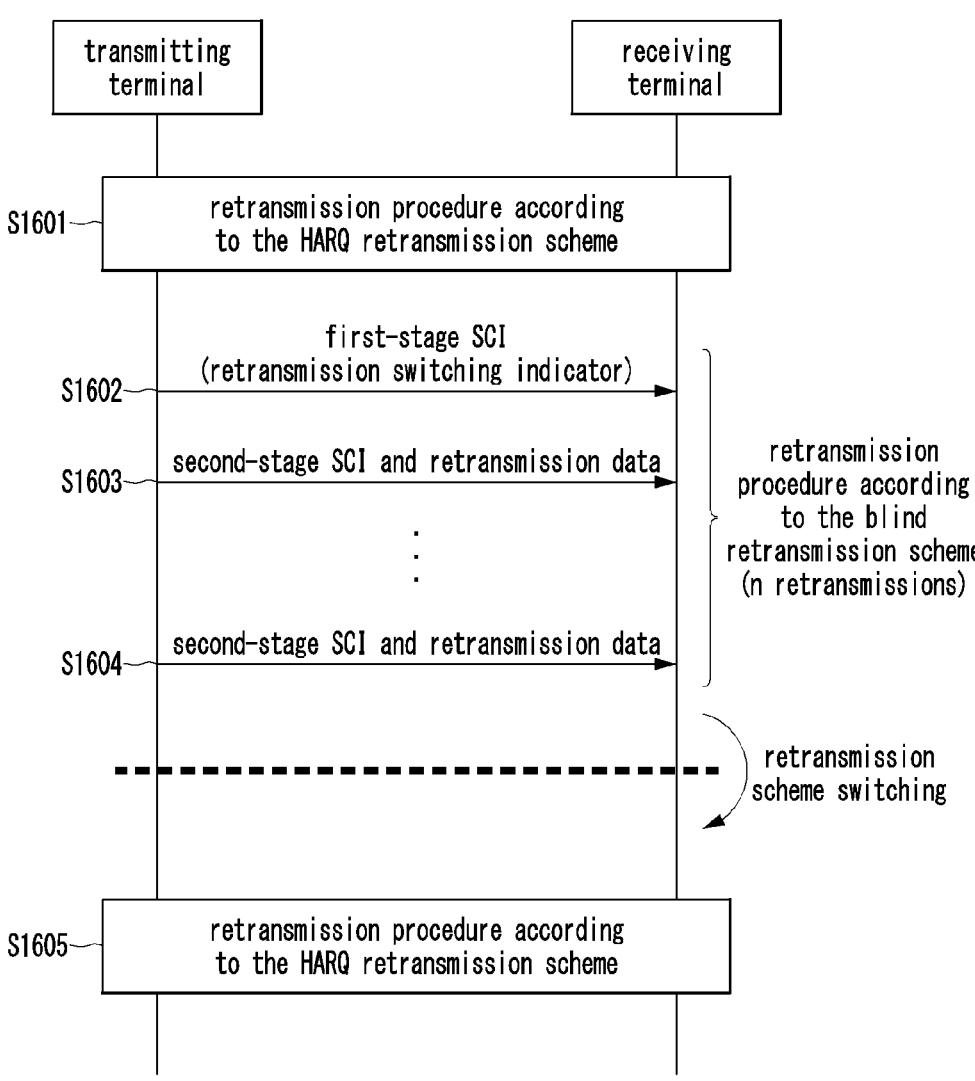

【FIG. 17】
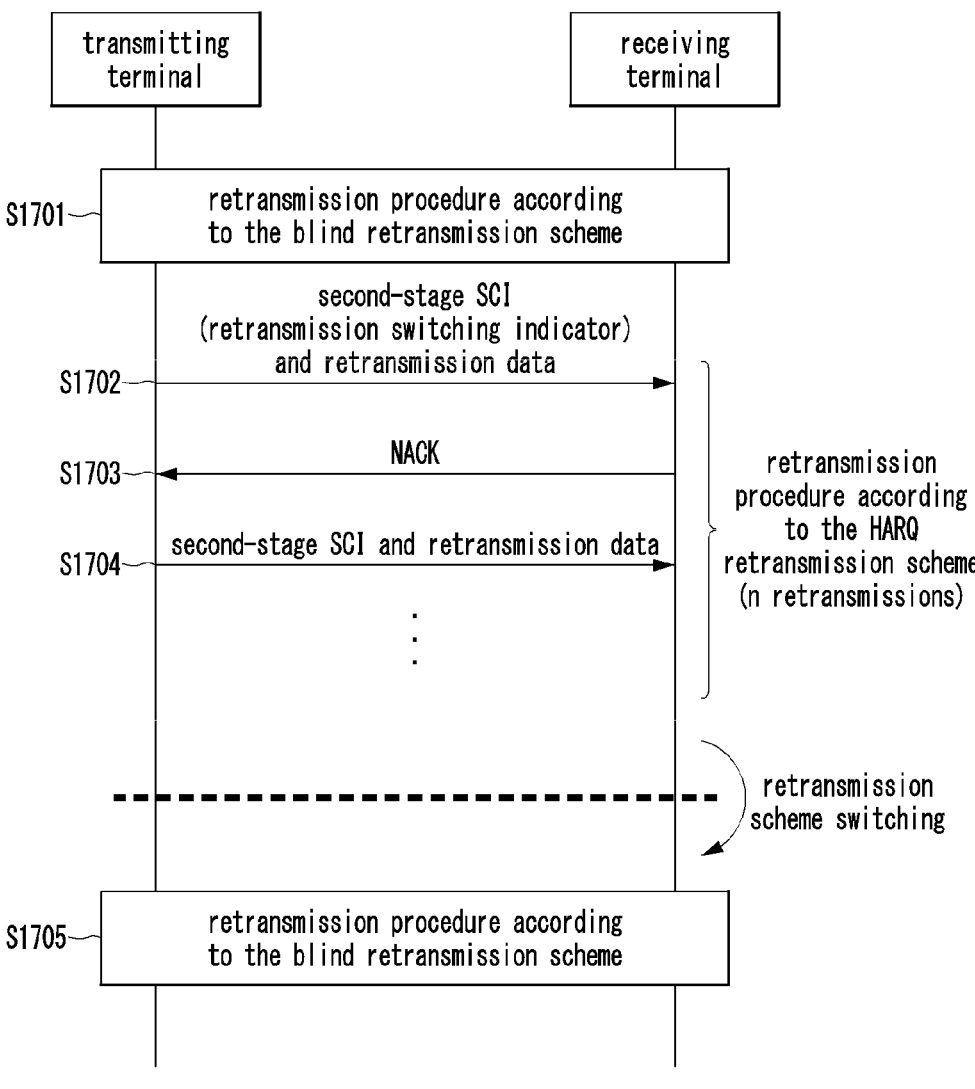

【FIG. 18】
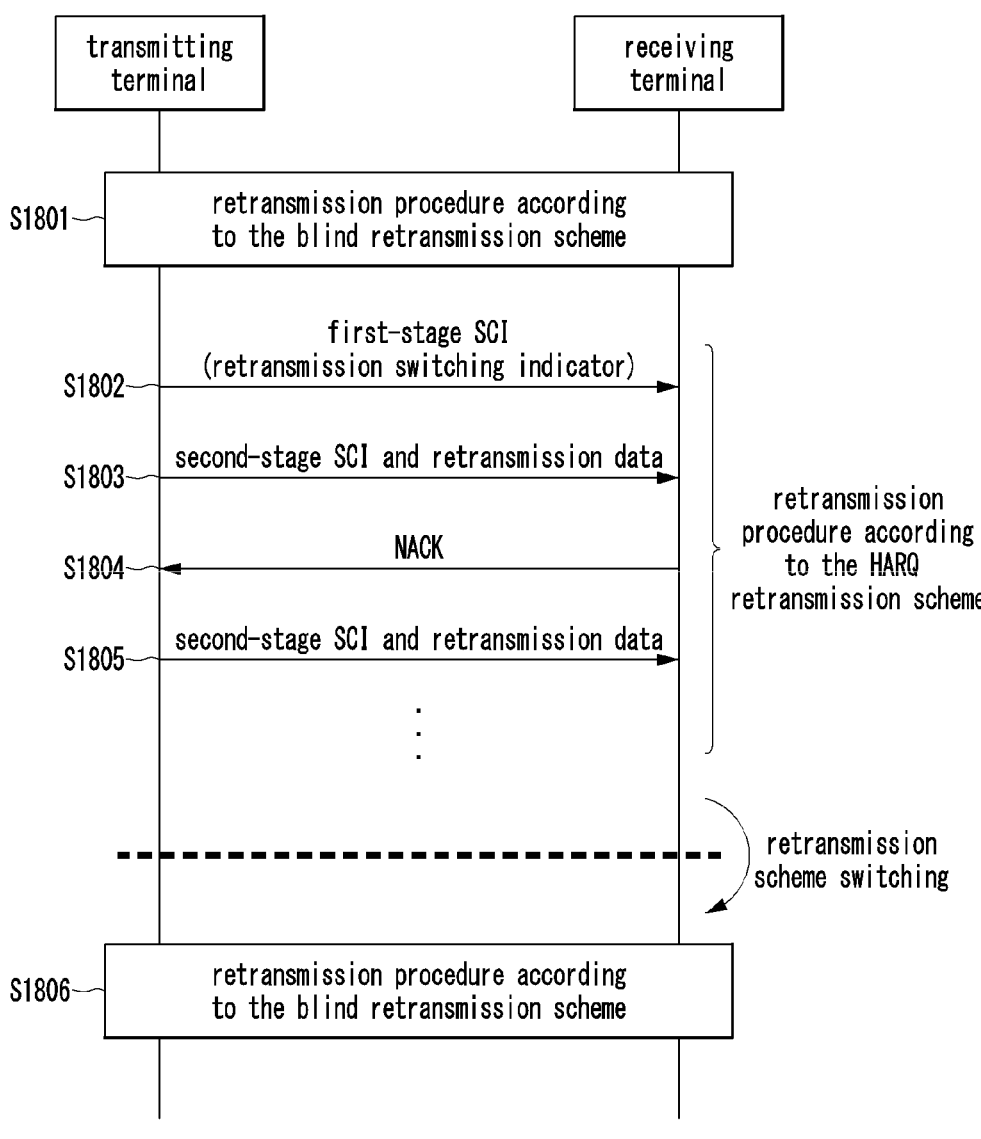

【FIG. 19】
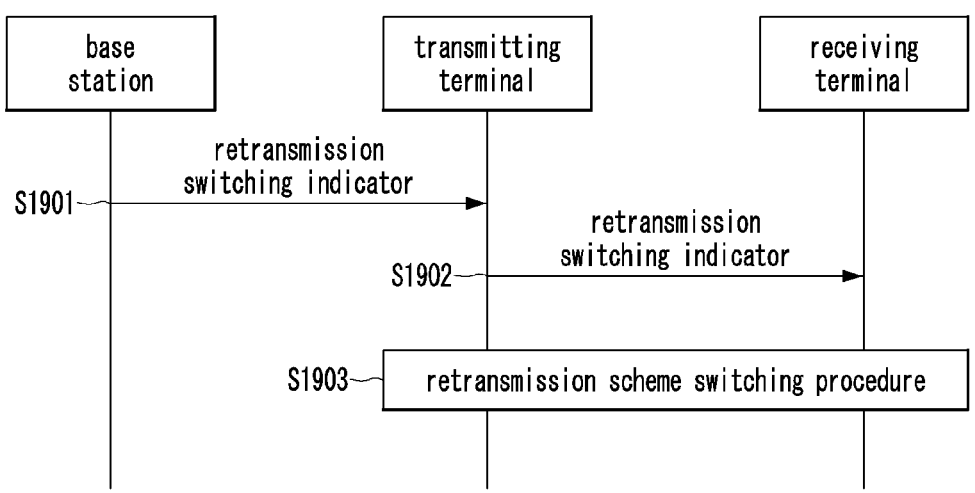

METHOD AND APPARATUS FOR RETRANSMISSION IN SIDELINK COMMUNICATION

CROSS-REFERENCE OF RELATED APPLICATIONS

This application is the U.S. National Phase under 35 U.S.C. § 371 of International Patent Application No. PCT/KR2021/008593, filed on Jul. 6, 2021, which in turn claims the benefit of U.S. Provisional Patent Application No. 63/053,137, filed on Jul. 17, 2020, the entire disclosures of which applications are incorporated by reference herein.

TECHNICAL FIELD

The present disclosure relates to a sidelink communication technique, and more particularly, to a technique for retransmitting data in sidelink communication.

BACKGROUND ART

A fifth-generation (5G) communication system (e.g., New Radio (NR) communication system) which uses a frequency band higher than a frequency band of a fourth-generation (4G) communication system (e.g., Long Term Evolution (LTE) communication system or LTE-Advanced (LTE-A) communication system) as well as the frequency band of the 4G communication system has been considered for processing of wireless data. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system can support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication systems, the V2X communications (e.g., C-V2X communications) may be performed based on sidelink communication technologies (e.g., Proximity-based Services (ProSe) communication technology, Device-to-Device (D2D) communication technology, or the like). For example, sidelink channels for vehicles participating in V2V communications can be established, and communications between the vehicles can be performed using the sidelink channels. Sidelink communication may be performed using configured grant (CG) resources. The CG resources may be periodically configured, and periodic data (e.g., periodic sidelink data) may be transmitted using the CG resources.

Meanwhile, a data retransmission procedure may be performed in sidelink communication. The data retransmission procedure may be performed based on various schemes. In this case, operation methods of different retransmission schemes are required in sidelink communication.

DISCLOSURE

Technical Problem

An objective of the present disclosure for solving the above-described problem is to provide a method and an apparatus for data retransmission in sidelink communication

Technical Solution

An operation method of a transmitting terminal, according to a first exemplary embodiment of the present disclosure for achieving the objective, may comprise: transmitting, to a receiving terminal, first data based on a first retransmission scheme; in response to that a preconfigured condition is satisfied, switching a retransmission scheme from the first retransmission scheme to a second retransmission scheme; and transmitting, to the receiving terminal, second data based on the second retransmission scheme, wherein the first retransmission scheme and the second retransmission scheme are distinguished according to whether a hybrid automatic repeat request (HARQ) feedback is transmitted.

The preconfigured condition may be configured from the base station through higher layer signaling.

A case in which the preconfigured condition is satisfied may be a case when negative acknowledgment (NACK) for the first data occurs n or more times or a case when a channel state between the transmitting terminal and the receiving terminal satisfies a reference, n being a natural number.

The operation method may further comprise transmitting, to the receiving terminal, a first indicator indicating that the retransmission scheme is switched, wherein the transmitting of the second data is performed after transmission of the first indicator.

The first indicator may be included in first-stage sidelink control information (SCI) or second-stage SCI transmitted from the transmitting terminal to the receiving terminal.

The operation method may further comprise, when the retransmission scheme is switched, transmitting, to the base station, a second indicator indicating that the retransmission scheme is switched.

The operation method may further comprise: transmitting, to the base station, a third indicator requesting switching of the retransmission scheme; and receiving, from the base station, a fourth indicator allowing switching of the retransmission scheme, wherein the retransmission scheme is switched when the fourth indicator is received.

The operation method may further comprise receiving, from a base station, a fifth indicator requesting switching of the retransmission scheme, wherein the retransmission scheme is switched when the fifth indicator is received.

The retransmission scheme may be switched in unit of a transport block (TB), code block group (CBG), or HARQ process.

When the first retransmission scheme is a HARQ retransmission scheme, the second retransmission scheme may be a blind retransmission scheme; when the first retransmission scheme is the blind retransmission scheme, the second retransmission scheme may be the HARQ retransmission scheme; when the HARQ retransmission scheme is used, the HARQ feedback may be transmitted; and when the blind retransmission scheme is used, the HARQ feedback may not be transmitted.

An operation method of a receiving terminal, according to a second exemplary embodiment of the present disclosure for achieving the objective, may comprise: receiving, from a transmitting terminal, first data based on a first retransmission scheme; receiving, from the transmitting terminal, a first indicator indicating that a retransmission scheme is switched; and receiving, from the transmitting terminal, second data based on a second retransmission scheme, wherein the first retransmission scheme and the second retransmission scheme are distinguished according to whether a hybrid automatic repeat request (HARQ) feedback is transmitted.

The first indicator may be included in first-stage sidelink control information (SCI) or second-stage SCI transmitted from the transmitting terminal to the receiving terminal.

The operation method may further comprise: in response to that a preconfigured condition is satisfied, determining that the second retransmission scheme is switched to the first retransmission scheme; and receiving, from the transmitting terminal, third data based on the first retransmission scheme.

The preconfigured condition may be configured from the base station through higher layer signaling.

A case in which the preconfigured condition is satisfied may be a case when negative acknowledgment (NACK) for the second data occurs n or more times or a case when a channel state between the transmitting terminal and the receiving terminal satisfies a reference, n being a natural number.

When the first retransmission scheme is a HARQ retransmission scheme, the second retransmission scheme may be a blind retransmission scheme; when the first retransmission scheme is the blind retransmission scheme, the second retransmission scheme may be the HARQ retransmission scheme; when the HARQ retransmission scheme is used, the HARQ feedback may be transmitted; and when the blind retransmission scheme is used, the HARQ feedback may not be transmitted.

A transmitting terminal, according to a third exemplary embodiment of the present disclosure for achieving the objective, may comprise: a processor; and a memory storing one or more instructions executable by the processor, wherein the one or more instructions are executed to perform: transmitting, to a receiving terminal, first data based on a first retransmission scheme; in response to that a preconfigured condition is satisfied, switching a retransmission scheme from the first retransmission scheme to a second retransmission scheme; and transmitting, to the receiving terminal, second data based on the second retransmission scheme, wherein the first retransmission scheme and the second retransmission scheme are distinguished according to whether a hybrid automatic repeat request (HARQ) feedback is transmitted.

The first indicator may be included in first-stage sidelink control information (SCI) or second-stage SCI transmitted from the transmitting terminal to the receiving terminal.

The one or more instructions may be further executed to perform: when the retransmission scheme is switched, transmitting, to the base station, a second indicator indicating that the retransmission scheme is switched.

The one or more instructions may be executed to perform: transmitting, to the base station, a third indicator requesting switching of the retransmission scheme; and receiving, from the base station, a fourth indicator allowing switching of the retransmission scheme, wherein the retransmission scheme is switched when the fourth indicator is received.

Advantageous Effects

According to the present disclosure, the transmitting terminal can transmit data to the receiving terminal based on the first retransmission scheme, switch the first retransmission scheme to the second retransmission scheme, and transmit the data to the receiving terminal based on the second retransmission scheme. The switching of the retransmission scheme may be reported to the base station and/or the receiving terminal. The retransmission scheme may be switched when preconfigured condition(s) are satisfied. Accordingly, in sidelink communication, the retransmission scheme can be efficiently switched, and the performance of the communication system can be improved.

DESCRIPTION OF DRAWINGS

FIG. 1 is a conceptual diagram illustrating V2X communication scenarios.

FIG. 2 is a conceptual diagram illustrating an exemplary embodiment of a cellular communication system.

FIG. 3 is a conceptual diagram illustrating an exemplary embodiment of a communication node constituting a cellular communication system.

FIG. 4 is a block diagram illustrating an exemplary embodiment of a user plane protocol stack of a UE performing sidelink communication.

FIG. 5 is a block diagram illustrating a first exemplary embodiment of a control plane protocol stack of a UE performing sidelink communication.

FIG. 6 is a block diagram illustrating a second exemplary embodiment of a control plane protocol stack of a UE performing sidelink communication.

FIG. 7 is a sequence chart illustrating a first exemplary embodiment of a retransmission method according to a HARQ retransmission scheme in sidelink communication.

FIG. 8 is a sequence chart illustrating a first exemplary embodiment of a retransmission method according to a blind retransmission scheme in sidelink communication.

FIG. 9 is a sequence chart illustrating a first exemplary embodiment of a retransmission scheme switching method in sidelink communication.

FIG. 10 is a sequence chart illustrating a second exemplary embodiment of a retransmission scheme switching method in sidelink communication.

FIG. 11 is a sequence chart illustrating a third exemplary embodiment of a retransmission scheme switching method in sidelink communication.

FIG. 12 is a sequence chart illustrating a fourth exemplary embodiment of a retransmission scheme switching method in sidelink communication.

FIG. 13 is a sequence chart illustrating a fifth exemplary embodiment of a retransmission scheme switching method in sidelink communication.

FIG. 14 is a sequence chart illustrating a sixth exemplary embodiment of a retransmission scheme switching method in sidelink communication.

FIG. 15 is a sequence chart illustrating a seventh exemplary embodiment of a retransmission scheme switching method in sidelink communication.

FIG. 16 is a sequence chart illustrating an eighth exemplary embodiment of a retransmission scheme switching method in sidelink communication.

FIG. 17 is a sequence chart illustrating a ninth exemplary embodiment of a retransmission scheme switching method in sidelink communication.

FIG. 18 is a sequence chart illustrating a tenth exemplary embodiment of a retransmission scheme switching method in sidelink communication.

FIG. 19 is a sequence chart illustrating an eleventh exemplary embodiment of a retransmission scheme switching method in sidelink communication.

MODES OF THE INVENTION

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, preferred exemplary embodiments of the present invention will be described in detail with reference to the accompanying drawings. In describing the present invention, to facilitate the entire understanding, like numbers refer to like elements throughout the description of the figures and the repetitive description thereof will be omitted.

FIG. 1 is a conceptual diagram illustrating V2X communication scenarios.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged through the V2V communications. The V2V communications supported in the cellular communication system 140 may be performed based on "sidelink" communication technologies (e.g., ProSe and D2D communication technologies, and the like). In this case, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g., ProSe and D2D communication technologies, and the like). In this case, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 through the V2P communications. The communication node located in the vehicle 100 or the communication node carried by the person 130 may generate an alarm indicating a danger by judging a dangerous situation based on the obtained driving information and movement information. The V2P communications supported in the cellular communication system 140 may be performed based on sidelink communication technologies (e.g., ProSe and D2D communication technologies, and the like). In this case, the communications between the communication node located in the vehicle 100 and the communication node carried by the person 130 may be performed using at least one sidelink channel established between the communication nodes.

The V2N communications may be communications between the first vehicle 100 (e.g., the communication node located in the vehicle 100) and a server connected through the cellular communication system 140. The V2N communications may be performed based on the 4G communication technology (e.g., LTE or LTE-A) or the 5G communication technology (e.g., NR). Also, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

FIG. 2 is a conceptual diagram illustrating an exemplary embodiment of a cellular communication system.

As shown in FIG. 2, a cellular communication system may include an access network, a core network, and the like. The access network may include a base station 210, a relay 220, User Equipments (UEs) 231 through 236, and the like. The UEs 231 through 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, and the core network constituted by the UPF 250, the SMF 260, and the AMF 270 may support the 4G communication technology as well as the 5G communication technology.

In addition, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) comprising the cellular communication system may perform communications by using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) comprising the cellular communication system may be configured as follows.

FIG. 3 is a conceptual diagram illustrating an exemplary embodiment of a communication node constituting a cellular communication system.

As shown in FIG. 3, a communication node 300 may comprise at least one processor 310, a memory 320, and a transceiver 330 connected to a network for performing communications. Also, the communication node 300 may further comprise an input interface device 340, an output interface device 350, a storage device 360, and the like. Each component included in the communication node 300 may communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may comprise at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may transmit signals received from the core network to the UEs 231 through 236 and the relay 220, and may transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. That is, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. That is, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

Here, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
|---|---|---|
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

FIG. 4 is a block diagram illustrating an exemplary embodiment of a user plane protocol stack of a UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may comprise a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications, and the layer 2-ID may be an ID configured for the V2X communications (e.g., V2X service). Also, in the sidelink communications, a hybrid automatic repeat request (HARQ) feedback operation may be supported, and an RLC acknowledged mode (RLC AM) or an RLC unacknowledged mode (RLC UM) may be supported.

Meanwhile, a control plane protocol stack of the UEs (e.g., the UEs 235 and 236) performing sidelink communications may be configured as follows.

FIG. 5 is a block diagram illustrating a first exemplary embodiment of a control plane protocol stack of a UE performing sidelink communication, and FIG. 6 is a block diagram illustrating a second exemplary embodiment of a control plane protocol stack of a UE performing sidelink communication.

As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Also, a demodulation reference signal (DM-RS), a synchronization signal, or the like may be used in the sidelink communications between the UEs 235 and 236. The synchronization signal may include a primary sidelink synchronization signal (PSSS) and a secondary sidelink synchronization signal (SSSS).

Meanwhile, a sidelink transmission mode (TM) may be classified into sidelink TMs 1 to 4 as shown below in Table 2.

TABLE 2

| Sidelink TM | Description |
| --- | --- |
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In this case, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In this case, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In this case, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In this case, the sidelink data may be transmitted and received through resources selected autonomously by the UE (e.g., UE 235 or 236) within the resource pool configured by the dedicated RRC signaling procedure or the broadcast RRC signaling procedure.

Hereinafter, sidelink communication methods based on discontinuous reception (DRX) operations will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a UE #1 (e.g., vehicle #1) is described, a UE #2 (e.g., vehicle #2) corresponding thereto may perform an operation corresponding to the operation of the UE #1. Conversely, when an operation of the UE #2 is described, the corresponding UE #1 may perform an operation corresponding to the operation of the UE #2. In exemplary embodiments described below, an operation of a vehicle may be an operation of a communication node located in the vehicle.

In exemplary embodiments, signaling may be one or a combination of two or more of higher layer signaling, MAC signaling, and physical (PHY) signaling. A message used for higher layer signaling may be referred to as a 'higher layer message' or 'higher layer signaling message'. A message used for MAC signaling may be referred to as a 'MAC message' or 'MAC signaling message'. A message used for PHY signaling may be referred to as a 'PHY message' or 'PHY signaling message'. The higher layer signaling may refer to an operation of transmitting and receiving system information (e.g., master information block (MIB), system information block (SIB)) and/or an RRC message. The MAC signaling may refer to an operation of transmitting and receiving a MAC control element (CE). The PHY signaling may refer to an operation of transmitting and receiving control information (e.g., downlink control information (DCI), uplink control information (UCI), or SCI).

A sidelink signal may be a synchronization signal and a reference signal used for sidelink communication. For example, the synchronization signal may be a synchronization signal/physical broadcast channel (SS/PBCH) block, sidelink synchronization signal (SLSS), primary sidelink synchronization signal (PSSS), secondary sidelink synchronization signal (SSSS), or the like. The reference signal may be a channel state information-reference signal (CSI-RS), DM-RS, phase tracking-reference signal (PT-RS), cell-specific reference signal (CRS), sounding reference signal (SRS), discovery reference signal (DRS), or the like.

A sidelink channel may be a PSSCH, PSCCH, PSDCH, PSBCH, physical sidelink feedback channel (PSFCH), or the like. In addition, a sidelink channel may refer to a sidelink channel including a sidelink signal mapped to specific resources in the corresponding sidelink channel. The sidelink communication may support a broadcast service, a multicast service, a groupcast service, and a unicast service.

The sidelink communication may be performed based on a single-SCI scheme or a multi-SCI scheme. When the single-SCI scheme is used, data transmission (e.g., sidelink data transmission, sidelink-shared channel (SL-SCH) transmission) may be performed based on one SCI (e.g., 1st-stage SCI). When the multi-SCI scheme is used, data transmission may be performed using two SCIs (e.g., 1st-stage SCI and 2nd-stage SCI). The SCI(s) may be transmitted on a PSCCH and/or a PSSCH. When the single-SCI scheme is used, the SCI (e.g., 1st-stage SCI) may be transmitted on a PSCCH. When the multi-SCI scheme is used, the 1st-stage SCI may be transmitted on a PSCCH, and the 2nd-stage SCI may be transmitted on the PSCCH or a PSSCH. The 1st-stage SCI may be referred to as 'first-stage SCI', and the 2nd-stage SCI may be referred to as 'second-stage SCI'. A format of the first-stage SCI may include a SCI format 1-A, and a format of the second-stage SCI may include a SCI format 2-A and a SCI format 2-B.

The 1st-stage SCI may include or more information elements among priority information, frequency resource assignment information, time resource assignment information, resource reservation period information, demodulation reference signal (DMRS) pattern information, 2nd-stage SCI format information, a beta offset indicator, the number of DMRS ports, and modulation and coding scheme (MCS)

information. The 2nd-stage SCI may include one or more information elements among a HARQ processor identifier (ID), a redundancy version (RV), a source ID, a destination ID, CSI request information, a zone ID, and communication range requirements.

Meanwhile, data may be retransmitted in sidelink communication. The data (e.g., sidelink (SL) data) may be retransmitted based on a HARQ retransmission scheme or a blind retransmission scheme. The HARQ retransmission scheme may be referred to as a first retransmission scheme, and the blind retransmission scheme may be referred to as a second retransmission scheme. Alternatively, the HARQ retransmission scheme may be referred to as a second retransmission scheme, and the blind retransmission scheme may be referred to as a first retransmission scheme. When the HARQ retransmission scheme is used, when a negative acknowledgment (NACK) or discontinuous transmission (DTX) for the data occurs, the data may be retransmitted. A case when the HARQ retransmission scheme is used may mean that HARQ feedback is enabled. A case when the blind retransmission scheme is used, the data may be retransmitted regardless of a HARQ feedback (e.g., NACK or DTX) for the data. The case when the blind retransmission scheme is used may mean that HARQ feedback is disabled.

Sidelink communication may support the HARQ retransmission scheme and/or blind retransmission scheme. For example, the HARQ retransmission scheme may be used in sidelink communication, and the retransmission scheme may be switched from the HARQ retransmission scheme to the blind retransmission scheme when preconfigured condition(s) (e.g., triggering condition(s)) are satisfied. Alternatively, the blind retransmission scheme may be used in sidelink communication, and the retransmission scheme may be switched from the blind retransmission scheme to the HARQ retransmission scheme when preconfigured condition(s) (e.g., triggering condition(s)) are satisfied. The switching of the retransmission scheme may be performed in unit of data, transport block (TB), code block group (CBG), or HARQ process.

FIG. 7 is a sequence chart illustrating a first exemplary embodiment of a retransmission method according to a HARQ retransmission scheme in sidelink communication.

As shown in FIG. 7, the communication system may include a transmitting terminal and a receiving terminal. The transmitting terminal may mean a terminal transmitting SL data, and the receiving terminal may mean a terminal receiving the SL data. For example, the transmitting terminal may be the UE 235 shown in FIG. 2 and the receiving terminal may be the UE 236 shown in FIG. 2. Each of the transmitting terminal and the receiving terminal may be configured identically or similarly to the communication node 300 shown in FIG. 3. Each of the transmitting terminal and the receiving terminal may support the protocol stacks shown in FIGS. 4 to 6.

Before a step S701, configuration information of sidelink communication (e.g., configuration information for the HARQ retransmission scheme) may transmitted to the transmitting terminal and/or the receiving terminal through system information and/or higher layer signaling (e.g., RRC message and/or MAC CE). The transmitting terminal may transmit first-stage SCI to the receiving terminal on a PSCCH (S701). The receiving terminal may receive the first-stage SCI from the transmitting terminal, and may identify information element(s) included in the first-stage SCI. The transmitting terminal may transmit second-stage SCI (e.g., second-stage SCI associated with the first-stage SCI transmitted in the step S701) and data to the receiving terminal on a PSSCH (S702). The receiving terminal may receive the second-stage SCI from the transmitting terminal, and may identify information element(s) included in the second-stage SCI. The receiving terminal may perform a data reception operation based on the first-stage SCI and/or the second-stage SCI.

When reception of the data fails (e.g., decoding of the data fails), the receiving terminal may transmit a NACK for the data to the transmitting terminal on a PSFCH (S703). When the NACK is received from the receiving terminal, the transmitting terminal may determine that reception of the data has failed in the receiving terminal. In this case, the transmitting terminal may retransmit the data to the receiving terminal (S704). In the step S704, the second-stage SCI and the data (e.g., retransmission data) may be transmitted to the receiving terminal on a PSSCH. Alternatively, in the step S704, the data may be retransmitted without the second-stage SCI. In the step S704, the receiving terminal may perform a reception operation of the retransmission data.

In exemplary embodiments, the second-stage SCI and the data may be transmitted on the same PSSCH. Alternatively, the second-stage SCI and the data may be transmitted on different PSSCHs. Alternatively, the second-stage SCI may be transmitted on a PSCCH, and the data may be transmitted on a PSSCH. When the single-SCI scheme is used, the retransmission procedure according to the HARQ retransmission scheme may be performed based on first-stage SCI without second-stage SCI. In this case, the retransmission data may be transmitted together with first-stage SCI instead of second-stage SCI. Alternatively, the data may be retransmitted without first-stage SCI.

FIG. 8 is a sequence chart illustrating a first exemplary embodiment of a retransmission method according to a blind retransmission scheme in sidelink communication.

As shown in FIG. 8, the communication system may include a transmitting terminal and a receiving terminal. The transmitting terminal may mean a terminal transmitting SL data, and the receiving terminal may mean a terminal receiving the SL data. For example, the transmitting terminal may be the UE 235 shown in FIG. 2 and the receiving terminal may be the UE 236 shown in FIG. 2. Each of the transmitting terminal and the receiving terminal may be configured identically or similarly to the communication node 300 shown in FIG. 3. Each of the transmitting terminal and the receiving terminal may support the protocol stacks shown in FIGS. 4 to 6.

Before a step S801, configuration information of sidelink communication (e.g., configuration information for the blind retransmission scheme) may transmitted to the transmitting terminal and/or the receiving terminal through system information and/or higher layer signaling (e.g., RRC message and/or MAC CE). The transmitting terminal may transmit first-stage SCI to the receiving terminal on a PSCCH (S801). The receiving terminal may receive the first-stage SCI from the transmitting terminal, and may identify information element(s) included in the first-stage SCI. The transmitting terminal may transmit second-stage SCI (e.g., second-stage SCI associated with the first-stage SCI transmitted in the step S701) and data to the receiving terminal on a PSSCH (S802). The receiving terminal may receive the second-stage SCI from the transmitting terminal, and may identify information element(s) included in the second-stage SCI. The receiving terminal may perform a data reception operation based on the first-stage SCI and/or the second-stage SCI.

After transmitting the first-stage SCI and the second-stage SCI, the transmitting terminal may retransmit the data (S803). The transmitting terminal may perform repeated data transmissions based on blind retransmission related information configured by system information, higher layer signaling, first-stage SCI, and/or second-stage SCI. In addition, the receiving terminal may perform a reception operation of retransmission data based on the blind retransmission-related information configured by system information, higher layer signaling, first-stage SCI, and/or second-stage SCI.

In the step S803, the second-stage SCI and the data (e.g., retransmission data) may be transmitted to the receiving terminal on a PSSCH. Alternatively, in the step S803, the data may be retransmitted without second-stage SCI.

In exemplary embodiments, the second-stage SCI and the data may be transmitted on the same PSSCH. Alternatively, the second-stage SCI and the data may be transmitted on different PSSCHs. Alternatively, the second-stage SCI may be transmitted on a PSCCH, and the data may be transmitted on a PSSCH. When the single-SCI scheme is used, the retransmission procedure according to the blind retransmission scheme may be performed based on first-stage SCI without second-stage SCI. In this case, the retransmission data may be transmitted together with first-stage SCI instead of second-stage SCI. Alternatively, the data may be retransmitted without first-stage SCI.

FIG. 9 is a sequence chart illustrating a first exemplary embodiment of a retransmission scheme switching method in sidelink communication.

As shown in FIG. 9, the communication system may include a transmitting terminal and a receiving terminal. The transmitting terminal may mean a terminal transmitting SL data, and the receiving terminal may mean a terminal receiving the SL data. For example, the transmitting terminal may be the UE 235 shown in FIG. 2 and the receiving terminal may be the UE 236 shown in FIG. 2. Each of the transmitting terminal and the receiving terminal may be configured identically or similarly to the communication node 300 shown in FIG. 3. Each of the transmitting terminal and the receiving terminal may support the protocol stacks shown in FIGS. 4 to 6.

In sidelink communication, the retransmission scheme may be switched from the HARQ retransmission scheme to the blind retransmission scheme. In a step S901, a retransmission procedure according to the HARQ retransmission scheme may be performed between the transmitting terminal and the receiving terminal. The step S901 may include the steps S701 to S704 shown in FIG. 7. When n NACKs occur for the same data (e.g., TB or CBG) in the step S901 or when the number of NACKs for the same data (e.g., TB or CBG) is greater than or equal to a threshold in the step S901, the transmitting terminal may transmit to the transmitting terminal a retransmission switching indicator indicating switching of the retransmission scheme (S902). Alternatively, the retransmission switching indicator may be transmitted regardless of the above-described condition(s). n may be a natural number. The threshold may be signaled to the transmitting terminal and/or the receiving terminal through at least one of system information, RRC message, MAC CE, or control information (e.g., DCI, SCI).

The retransmission switching indicator may indicate switching from the HARQ retransmission scheme to the blind retransmission scheme. The size of the retransmission switching indicator may be 1 bit or more. The retransmission switching indicator may be included in second-stage SCI. When there is a resource available for the blind retransmission scheme, the retransmission switching indicator may be included in second-stage SCI instead of first-stage SCI. In this case, retransmission data and second-stage SCI including the retransmission switching indicator may be transmitted in the step S902. When the single-SCI scheme is used, the retransmission switching indicator may be included in first-stage SCI instead of second-stage SCI.

In the step S902, the receiving terminal may receive the retransmission switching indicator from the transmitting terminal. When the retransmission switching indicator is received from the transmitting terminal, the receiving terminal may determine that the retransmission scheme of sidelink communication is switched from the HARQ retransmission scheme to the blind retransmission scheme. The transmitting terminal may retransmit data based on blind retransmission related information configured by system information, RRC message, MAC CE, first-stage SCI, and/or second-stage SCI (S903). The receiving terminal may perform a reception operation of the retransmission data based on the blind retransmission related information configured by system information, RRC message, MAC CE, first-stage SCI, and/or second-stage SCI. A resource used for the first blind retransmission may be a resource reserved by the previous SCI (e.g., the first-stage SCI in the step S901). For example, the resource used for the first blind retransmission may be a resource reserved for HARQ retransmission.

FIG. 10 is a sequence chart illustrating a second exemplary embodiment of a retransmission scheme switching method in sidelink communication.

As shown in FIG. 10, the communication system may include a transmitting terminal and a receiving terminal. The transmitting terminal may mean a terminal transmitting SL data, and the receiving terminal may mean a terminal receiving the SL data. For example, the transmitting terminal may be the UE 235 shown in FIG. 2 and the receiving terminal may be the UE 236 shown in FIG. 2. Each of the transmitting terminal and the receiving terminal may be configured identically or similarly to the communication node 300 shown in FIG. 3. Each of the transmitting terminal and the receiving terminal may support the protocol stacks shown in FIGS. 4 to 6.

In sidelink communication, the retransmission scheme may be switched from the HARQ retransmission scheme to the blind retransmission scheme. In a step S1001, a retransmission procedure according to the HARQ retransmission scheme may be performed between the transmitting terminal and the receiving terminal. The step S1001 may include the steps S701 to S704 shown in FIG. 7. That is, the step S1001 may be the same as the step S901 shown in FIG. 9. When n NACKs occur for the same data (e.g., TB or CBG) in the step S1001 or when the number of NACKs for the same data (e.g., TB or CBG) is greater than or equal to a threshold in the step S1001, the transmitting terminal may transmit to the transmitting terminal a retransmission switching indicator indicating switching of the retransmission scheme (S1002). Alternatively, the retransmission switching indicator may be transmitted regardless of the above-described condition(s). n may be a natural number. The threshold may be signaled to the transmitting terminal and/or the receiving terminal through at least one of system information, RRC message, MAC CE, or control information (e.g., DCI, SCI).

The retransmission switching indicator may indicate switching from the HARQ retransmission scheme to the blind retransmission scheme. The size of the retransmission switching indicator may be 1 bit or more. The retransmission switching indicator may be included in first-stage SCI. When there is not a resource available for the blind retransmission scheme, the retransmission switching indicator may be included in the first-stage SCI instead of second-stage SCI. Thereafter, a retransmission procedure according to the blind retransmission scheme may be performed using a resource (e.g., reserved resource) allocated by the first-stage SCI transmitted in the step S1002. Alternatively, even when there is a resource available for the blind retransmission scheme, the retransmission switching indicator may be included in the first-stage SCI instead of second-stage SCI. In this case, the first-stage SCI transmitted in the step S1002 may indicate release of resources for the HARQ retransmission scheme configured in the step S1001. That is, the resources for the HARQ retransmission scheme configured in the step S1001 may be overridden with resources for the blind retransmission scheme by the first-stage SCI transmitted in the step S1002. Alternatively, the first-stage SCI transmitted in the step S1002 may be used to configure new blind retransmission resources.

In the step S1002, the receiving terminal may receive the retransmission switching indicator from the transmitting terminal. When the retransmission switching indicator is received from the transmitting terminal, the receiving terminal may determine that the retransmission scheme of sidelink communication is switched from the HARQ retransmission scheme to the blind retransmission scheme. The transmitting terminal may retransmit data based on blind retransmission related information configured by system information, RRC message, MAC CE, first-stage SCI, and/or second-stage SCI (S1003 and S1004). The receiving terminal may perform a reception operation of retransmission data based on the blind retransmission related information configured by system information, RRC message, MAC CE, first-stage SCI, and/or second-stage SCI. Here, the retransmission switching indicator may be transmitted through the second-stage SCI.

FIG. 11 is a sequence chart illustrating a third exemplary embodiment of a retransmission scheme switching method in sidelink communication.

As shown in FIG. 11, the communication system may include a transmitting terminal and a receiving terminal. The transmitting terminal may mean a terminal transmitting SL data, and the receiving terminal may mean a terminal receiving the SL data. For example, the transmitting terminal may be the UE 235 shown in FIG. 2 and the receiving terminal may be the UE 236 shown in FIG. 2. Each of the transmitting terminal and the receiving terminal may be configured identically or similarly to the communication node 300 shown in FIG. 3. Each of the transmitting terminal and the receiving terminal may support the protocol stacks shown in FIGS. 4 to 6.

In sidelink communication, the retransmission scheme may be switched from the blind retransmission scheme to the HARQ retransmission scheme. In a step S1101, a retransmission procedure according to the blind retransmission scheme may be performed between the transmitting terminal and the receiving terminal. The step S1101 may include the steps S801 to S803 shown in FIG. 8. The transmitting terminal may transmit a retransmission switching indicator indicating switching of the retransmission scheme to the receiving terminal (S1102). When data is retransmitted n or more times in the step S1101, the retransmission switching indicator may be transmitted. n may be a natural number. n may be signaled to the transmitting terminal and/or the receiving terminal through at least one of system information, RRC message, MAC CE, or control information (e.g., DCI, SCI).

The retransmission switching indicator may indicate switching from the blind retransmission scheme to the HARQ retransmission scheme. The size of the retransmission switching indicator may be 1 bit or more. The retransmission switching indicator may be included in second-stage SCI. When there is a resource available for the HARQ retransmission scheme, the retransmission switching indicator may be included in second-stage SCI instead of first-stage SCI. In this case, retransmission data and second-stage SCI including the retransmission switching indicator may be transmitted in the step S1102. When the single-SCI scheme is used, the retransmission switching indicator may be included in first-stage SCI instead of second-stage SCI.

In the step S1102, the receiving terminal may receive the retransmission switching indicator from the transmitting terminal. When the retransmission switching indicator is received from the transmitting terminal, the receiving terminal may determine that the retransmission scheme of the sidelink communication is switched from the blind retransmission scheme to the HARQ retransmission scheme. Communication between the transmitting terminal and the receiving terminal may be performed based on HARQ retransmission related information configured by system information, RRC message, MAC CE, first-stage SCI, and/or second-stage SCI. For example, when reception of the data fails in the step S1102, the receiving terminal may transmit a NACK for the data to the transmitting terminal (S1103). When the NACK for the data is received from the receiving terminal, the transmitting terminal may retransmit the data (S1104). In the step S1104, retransmission data may be transmitted together with second-stage SCI. A resource used for the first HARQ retransmission may be a resource reserved by the previous SCI (e.g., the first-stage SCI in the step S1101). For example, the resource used for the first HARQ retransmission may be a resource reserved for blind retransmission.

FIG. 12 is a sequence chart illustrating a fourth exemplary embodiment of a retransmission scheme switching method in sidelink communication.

As shown in FIG. 12, the communication system may include a transmitting terminal and a receiving terminal. The transmitting terminal may mean a terminal transmitting SL data, and the receiving terminal may mean a terminal receiving the SL data. For example, the transmitting terminal may be the UE 235 shown in FIG. 2 and the receiving terminal may be the UE 236 shown in FIG. 2. Each of the transmitting terminal and the receiving terminal may be configured identically or similarly to the communication node 300 shown in FIG. 3. Each of the transmitting terminal and the receiving terminal may support the protocol stacks shown in FIGS. 4 to 6.

In sidelink communication, the retransmission scheme may be switched from the blind retransmission scheme to the HARQ retransmission scheme. In a step S1201, a retransmission procedure according to the blind retransmission scheme may be performed between the transmitting terminal and the receiving terminal. The step S1201 may include the steps S801 to S803 shown in FIG. 8. That is, the step S1201 may be the same as the step S1101 shown in FIG. 11. The transmitting terminal may transmit a retransmission switching indicator indicating switching of the retransmission scheme to the receiving terminal (S1202). When data is retransmitted n or more times in the step S1201, the retransmission switching indicator may be transmitted. n may be a natural number. n may be signaled to the transmitting terminal and/or the receiving terminal through at least one of system information, RRC message, MAC CE, or control information (e.g., DCI, SCI).

The retransmission switching indicator may indicate switching from the blind retransmission scheme to the HARQ retransmission scheme. The size of the retransmission switching indicator may be 1 bit or more. The retransmission switching indicator may be included in first-stage SCI. When there is not a resource available for the HARQ retransmission scheme, the retransmission switching indicator may be included in first-stage SCI instead of second-stage SCI. Thereafter, a retransmission procedure according to the HARQ retransmission scheme may be performed using a resource (e.g., reserved resource) allocated by the first-stage SCI transmitted in the step S1202. Alternatively, even when there is a resource available for the HARQ retransmission scheme, the retransmission switching indicator may be included in first-stage SCI instead of second-stage SCI. In this case, the first-stage SCI transmitted in the step S1202 may indicate release of the resources for the blind retransmission scheme configured in the step S1201. That is, the resources for the blind retransmission scheme configured in the step S1201 may be overridden with resources for the HARQ retransmission scheme by the first-stage SCI transmitted in the step S1202. Alternatively, the first-stage SCI transmitted in the step S1202 may be used to configure new HARQ retransmission resources. Here, the retransmission switching indicator may be transmitted through second-stage SCI.

In the step S1202, the receiving terminal may receive the retransmission switching indicator from the transmitting terminal. When the retransmission switching indicator is received from the transmitting terminal, the receiving terminal may determine that the retransmission scheme of the sidelink communication is switched from the blind retransmission scheme to the HARQ retransmission scheme. Communication between the transmitting terminal and the receiving terminal may be performed based on HARQ retransmission related information configured by system information, RRC message, MAC CE, first-stage SCI, and/or second-stage SCI. For example, the transmitting terminal may transmit second-stage SCI and retransmission data to the receiving terminal (S1203). When reception of the data fails in the step S1203, the receiving terminal may transmit a NACK for the data to the transmitting terminal (S1204). When the NACK for the data is received from the receiving terminal, the transmitting terminal may determine that reception of the data has failed in the receiving terminal. Accordingly, the transmitting terminal may transmit second-stage SCI and retransmission data (S1205). In the step S1205, the receiving terminal may perform a monitoring operation to receive the retransmission data.

In the exemplary embodiments shown in FIGS. 9 and 11, resources reserved for the previous retransmission scheme and/or the number of the corresponding resources may be used as initial configuration values for the switched retransmission scheme after the retransmission scheme switching. For example, resources for the switched retransmission scheme may be configured as the resources reserved for the previous retransmission scheme, and an initial value for the number of retransmissions in the switched retransmission scheme may be set to the number of retransmissions remaining in the previous retransmission scheme.

In the exemplary embodiments shown in FIGS. 11 and 12, when the blind retransmission scheme is switched to the HARQ retransmission scheme and all blind retransmissions are not completed in the previous retransmission procedure according to the blind retransmission scheme, first data when performing retransmission according to the HARQ retransmission scheme may be the last data (e.g., retransmission data) transmitted in the blind retransmission scheme. Alternatively, when switching from the blind retransmission scheme to the HARQ retransmission scheme is performed, first data when performing retransmission according to the HARQ retransmission scheme may always be the last data (e.g., retransmission data) transmitted in the blind retransmission scheme.

When the blind retransmission scheme is switched to the HARQ retransmission scheme and all blind retransmissions are completed in the previous retransmission procedure according to the blind retransmission scheme, first data in the retransmission procedure according to the HARQ retransmission scheme may be new data after the last data transmitted in the blind retransmission scheme. Alternatively, regardless of whether the blind retransmission has been completed in the previous retransmission procedure according to the blind retransmission scheme, the first data to be transmitted after switching to the retransmission procedure according to the HARQ retransmission scheme may be new data after the last data transmitted in the blind retransmission scheme.

In the retransmission procedure according to the HARQ retransmission scheme, when the first data transmission starts with the last data according to the blind retransmission scheme, the receiving terminal may combine the data received according to the previous blind retransmission scheme with the data received according to the HARQ retransmission scheme, and based on a result of the combining, the receiving terminal may determine a HARQ response (e.g., ACK or NACK). Alternatively, the receiving terminal may determine a HARQ response to the data received according to the HARQ retransmission scheme without combining with the data received according to the previous blind retransmission scheme.

The retransmission switching indicator may be configured as 1 bit in form of a toggle bit. For example, the retransmission switching indicator set to a first value (e.g., 0) may indicate switching of the retransmission scheme, and the retransmission switching indicator set to a second value (e.g., 1) may indicate maintaining of the current retransmission scheme. Alternatively, the retransmission switching indicator set to a first value (e.g., 0) may indicate to perform a retransmission procedure according to the blind retransmission scheme, and the retransmission switching indicator set to a second value (e.g., 1) may indicate to perform a retransmission procedure according to the HARQ retransmission scheme. The switching procedure of the retransmission scheme may be performed based on one or more of the exemplary embodiments shown in FIGS. 9 to 12.

Field(s) included in the SCI (e.g., first-stage SCI and/or second-stage SCI) may be used to indicate the retransmission switching indicator. For example, a HARQ feedback enable/disable field (e.g., HARQ feedback enable/disable indicator) included in the second-stage SCI may be used. When the HARQ feedback enable/disable field indicates that HARQ feedback is enabled, this may indicate that the HARQ retransmission scheme is used. When the HARQ feedback enable/disable field indicates that HARQ feedback is disabled, this may indicate that the blind retransmission scheme is used.

As another example, the switching of the retransmission scheme may be implicitly or explicitly indicated by field(s) related to the HARQ retransmission scheme (e.g., field related to PSFCH resource allocation, filed indicating the maximum number of retransmissions, and/or new data indicator (NDI) field) included in the SCI (e.g., first-stage SCI and/or second-stage SCI). Alternatively, the switching of the retransmission scheme may be implicitly or explicitly indicated by field(s) related to the blind retransmission scheme (e.g., field indicating the number of blind retransmissions (e.g., the maximum number of retransmissions) and/or a resource configuration field) included in the SCI (e.g., first-stage SCI and/or second-stage SCI).

The HARQ feedback enable/disable field may be used to indicate whether switching from the HARQ retransmission scheme to the blind retransmission scheme is possible. When the HARQ feedback enable/disable field indicates enabling of HARQ feedback, this may indicate that only the HARQ retransmission scheme is used. When the HARQ feedback enable/disable field indicates disabling of HARQ feedback, this may indicate that switching from the HARQ retransmission scheme to the blind retransmission scheme is possible. In this case, the retransmission scheme in sidelink communication may be switched from the HARQ retransmission scheme to the blind retransmission scheme as needed. When the HARQ feedback enable/disable field indicates disabling of HARQ feedback, other field(s) included in the SCI may implicitly or explicitly indicate switching of the retransmission scheme.

Alternatively, the HARQ feedback enable/disable field may be used to indicate whether switching from the blind retransmission scheme to the HARQ retransmission scheme is possible. When the HARQ feedback enable/disable field indicates enabling of HARQ feedback, this may indicate that switching from the blind retransmission scheme to the HARQ retransmission scheme is possible. In this case, the retransmission scheme in sidelink communication may be switched from the blind retransmission scheme to the HARQ retransmission scheme as needed. When the HARQ feedback enable/disable field indicates enabling of HARQ feedback, other field(s) included in the SCI may implicitly or explicitly indicate switching of the retransmission scheme. When the HARQ feedback enable/disable field indicates disabling of HARQ feedback, this may indicate that only the blind retransmission scheme is used. That is, when HARQ feedback is disabled, this may indicate that switching from the blind retransmission scheme to the HARQ retransmission scheme is impossible.

After the retransmission scheme is switched, the transmitting terminal may report the switching of the retransmission scheme to the base station. The transmitting terminal may transmit, to the base station, information indicating that the retransmission scheme is switched (hereinafter, referred to as a 'switching report indicator') by using an uplink resource (e.g., physical uplink control channel (PUCCH) or physical uplink shared channel (PUSCH)) allocated for reporting on switching of the retransmission scheme or an uplink resource (e.g., PUCCH or PUSCH) allocated for transmission of sidelink communication related information. The switching report indicator may be transmitted from the transmitting terminal to the base station through an RRC message, MAC CE, and/or control information (e.g., UCI). When the switching report indicator is included in control information (e.g., UCI), the switching report indicator may be configured as 1 bit in form of a toggle bit. For example, the switching report indicator set to a first value (e.g., 0) may indicate that the retransmission scheme is switched. The switching report indicator set to a second value (e.g., 1) may indicate that the current retransmission scheme is maintained. Alternatively, the switching report indicator set to a first value (e.g., 0) may indicate that the HARQ retransmission scheme is switched to the blind retransmission scheme. The switching report indicator set to a second value (e.g., 1) may indicate that the blind retransmission scheme is switched to the HARQ retransmission scheme.

When switching from the HARQ retransmission scheme to the blind retransmission scheme, the switching report indicator may be transmitted on an uplink channel allocated for reporting of a HARQ response (e.g., ACK or NACK) according to the HARQ retransmission scheme. HARQ response bit(s) in an uplink channel (e.g., UCI) may be configured as the switching report indicator. Alternatively, independent bit(s) in an uplink channel (e.g., UCI) may be configured as the switching report indicator.

FIG. 13 is a sequence chart illustrating a fifth exemplary embodiment of a retransmission scheme switching method in sidelink communication.

As shown in FIG. 13, the communication system may include a base station, a transmitting terminal, and a receiving terminal. The transmitting terminal may mean a terminal transmitting SL data, and the receiving terminal may mean a terminal receiving the SL data. For example, the transmitting terminal may be the UE 235 shown in FIG. 2, the receiving terminal may be the UE 236 shown in FIG. 2, and the base station may be the base station 210 shown in FIG. 2. Each of the base station, the transmitting terminal, and the receiving terminal may be configured identically or similarly to the communication node 300 shown in FIG. 3. Each of the transmitting terminal and the receiving terminal may support the protocol stacks shown in FIGS. 4 to 6.

A retransmission scheme switching procedure may be performed between the transmitting terminal and the receiving terminal (S1301). The retransmission scheme switching procedure may be performed according to one or more of the exemplary embodiments shown in FIGS. 9 to 12. In the retransmission scheme switching procedure, the HARQ retransmission scheme may be switched to the blind retransmission scheme. Alternatively, the blind retransmission scheme may be switched to the HARQ retransmission scheme in the retransmission scheme switching procedure.

When the retransmission scheme switching is completed, the transmitting terminal may transmit a switching report indicator indicating that the retransmission scheme switching is completed to the base station using an uplink resource (e.g., PUCCH and/or PUSCH) (S1302). The base station may receive the switching report indicator from the transmitting terminal, and based on the switching report indicator, the base station may determine that the retransmission scheme between the transmitting terminal and the receiving terminal is switched. In addition, the base station may identify the switched retransmission scheme (e.g., HARQ retransmission scheme or blind retransmission scheme) based on the switching report indicator.

FIG. 14 is a sequence chart illustrating a sixth exemplary embodiment of a retransmission scheme switching method in sidelink communication.

As shown in FIG. 14, the communication system may include a base station, a transmitting terminal, and a receiving terminal. The transmitting terminal may mean a terminal transmitting SL data, and the receiving terminal may mean a terminal receiving the SL data. For example, the transmitting terminal may be the UE 235 shown in FIG. 2, the receiving terminal may be the UE 236 shown in FIG. 2, and the base station may be the base station 210 shown in FIG. 2. Each of the base station, the transmitting terminal, and the receiving terminal may be configured identically or similarly to the communication node 300 shown in FIG. 3. Each of the transmitting terminal and the receiving terminal may support the protocol stacks shown in FIGS. 4 to 6.

The transmitting terminal may determine a necessity of switching the retransmission scheme. When it is determined that switching of the retransmission scheme is required, the transmitting terminal may transmit a switching request indicator requesting switching of the retransmission scheme to the base station using an uplink resource (e.g., PUCCH and/or PUSCH) (S1401). The switching request indicator may include a 'request for switching from the HARQ retransmission scheme to the blind retransmission scheme' or 'request for switching from the blind retransmission scheme to the HARQ retransmission scheme' as well as a 'request for the retransmission scheme switching'.

The base station may receive the switching request indicator from the transmitting terminal, and identify that switching of the retransmission scheme is requested based on the switching request indicator. In addition, the base station may identify the type of the retransmission scheme to be switched (e.g., HARQ retransmission scheme or blind retransmission scheme). The base station may determine whether to approve switching of the retransmission scheme. When switching of the retransmission scheme is approved, the base station may transmit a switching approval indicator indicating that switching of the retransmission scheme is approved to the transmitting terminal using a downlink resource (e.g., PDCCH and/or PDSCH) (S1402). The switching approval indicator may indicate approval of switching of the retransmission scheme as well as the type of the retransmission scheme to be switched.

The transmitting terminal may receive the switching approval indicator from the base station, and may determine that switching of the retransmission scheme is approved based on the switching approval indicator. In this case, the retransmission scheme switching procedure may be performed between the transmitting terminal and the receiving terminal (S1403). The retransmission scheme switching procedure may be performed based on one or more of the exemplary embodiments shown in FIGS. 9 to 12.

The transmitting terminal may transmit the switching request indicator to the base station using an uplink resource (e.g., PUCCH or PUSCH) allocated for the retransmission scheme switching request or an uplink resource (e.g., PUCCH or PUSCH) allocated for transmitting information related to sidelink communication to the base station. The switching request indicator may be transmitted from the transmitting terminal to the base station through an RRC message, MAC CE, and/or control information (e.g., UCI).

Upon receiving the switching request indicator, the base station may explicitly or implicitly inform the transmitting terminal of information indicating approval or disapproval of the switching of the retransmission scheme. The switch approval indicator (or switch disapproval indicator) may be transmitted using a downlink resource (e.g., PDCCH or PDSCH). The above-described indicator (e.g., switching request indicator, switching approval indicator, or switching disapproval indicator) may be configured as an independent field (e.g., independent field within DCI). Alternatively, the above-described indicator may be explicitly or implicitly indicated in the transmission procedure of configuration information of the HARQ retransmission scheme or the blind retransmission scheme.

In the exemplary embodiments shown in FIGS. 13 and 14, triggering condition(s) for the retransmission scheme switching may be configured for the transmitting terminal to determine the necessity of switching the retransmission scheme, and the retransmission scheme may be switched according to the triggering condition(s). The base station may transmit the triggering condition (s) to the transmitting terminal and/or receiving terminal using one or a combination of two or more of system information, RRC message, MAC CE, and control information (e.g., DCI). For example, a plurality of triggering conditions may be configured by higher layer signaling (e.g., system information, RRC message, and/or MAC CE), and the base station may select specific triggering condition(s) from among the plurality of triggering conditions, and inform the selected specific triggering condition(s) to the transmitting terminal and/or the receiving terminal. The base station may inform the selected specific triggering condition(s) to the transmitting terminal and/or the receiving terminal using higher layer signaling, control information (e.g., DCI), or a data channel. Alternatively, specific triggering condition(s) among the plurality of triggering conditions may be selected by the transmitting terminal. In this case, the transmitting terminal may inform the selected specific triggering condition(s) to the receiving terminal using higher layer signaling or a sidelink channel (e.g., PSCCH (e.g., first-stage SCI), PSSCH (e.g., second-stage SCI)).

The triggering condition(s) may be classified into type 1 triggering condition(s) for switching from the HARQ retransmission scheme to the blind retransmission scheme and type 2 triggering condition(s) for switching from the blind retransmission scheme to the HARQ retransmission scheme. The type 1 triggering condition(s) may include one or more triggering conditions, and the type 2 triggering condition(s) may include one or more triggering conditions. The base station may select the type 1 triggering condition (s) and/or the type 2 triggering condition(s), and inform the transmitting terminal and/or the receiving terminal of the selected triggering condition(s). In this case, the base station may transmit the selected triggering condition(s) to the transmitting terminal and/or the receiving terminal using higher layer signaling, control information, or a data channel. Alternatively, the transmitting terminal may select the type 1 triggering condition(s) and/or the type 2 triggering condition(s), and inform the receiving terminal of the selected triggering condition(s). In this case, the transmitting terminal may inform the selected triggering condition(s) to the receiving terminal using higher layer signaling or a sidelink channel (e.g., PSCCH (e.g., first-stage SCI), PSSCH (e.g., second-stage SCI)).

The type 1 triggering condition(s) may include a condition in which continuous NACKs or continuous DTXs occur. When the number of continuous NACKs or the number of continuous DTXs is greater than or equal to a threshold, the type 1 triggering condition may be satisfied. When the type 1 triggering condition is satisfied, the retransmission scheme may be switched from the HARQ retransmission scheme to the blind retransmission scheme. The above threshold may be set by the base station. In this case, the base station may inform the threshold for the type 1 triggering condition to the transmitting terminal and/or the receiving terminal using higher layer signaling, control information, or a data channel. Alternatively, the above threshold may be set by the transmitting terminal. In this case, the transmitting terminal may inform the threshold for the type 1 triggering condition to the receiving terminal using higher layer signaling or a sidelink channel (e.g., PSCCH (e.g., first-stage SCI), PSSCH (e.g., second-stage SCI)).

For another example, the triggering condition may include a condition in which a channel state (e.g., channel quality state) satisfies a specific reference. Channel state information may be reported to the base station from the transmitting terminal and/or the receiving terminal. Also, channel state information may be reported from the receiving terminal to the transmitting terminal. Here, the channel state may mean a channel state in a sidelink between the transmitting terminal and the receiving terminal. The specific reference may be a reference value of a channel quality indicator (CQI) or a reference value of a reference signal received power (RSRP). When the channel state is less than or equal to the reference value of CQI or the reference value of RSRP, the retransmission scheme may be switched. Alternatively, when the channel state exceeds the reference value of CQI or RSRP, the retransmission scheme may be switched. The triggering condition(s) may be configured based on a reference metric (e.g., channel state information (e.g., CQI, RSRP, rank indicator (RI), precoding matrix indicator (PMI)), a reference value (e.g., threshold) for each channel state).

For another example, the triggering condition may include a condition in which a channel occupancy state satisfies a specific reference. Channel occupancy state information may be reported to the base station from the transmitting terminal and/or the receiving terminal. In addition, channel occupancy state information may be reported from the receiving terminal to the transmitting terminal. Here, a channel occupancy state may mean a channel occupancy state in a sidelink between the transmitting terminal and the receiving terminal. When the channel occupancy state is less than or equal to a reference value, the retransmission scheme may be switched. Alternatively, when the channel occupancy state exceeds the reference value, the retransmission scheme may be switched. The reference value for the channel occupancy state may be configured to the terminal (e.g., transmitting terminal and/or receiving terminal) through one or a combination of two or more of system information, RRC message, MAC CE, and control information.

A plurality of triggering conditions may be configured by higher layer signaling, and the base station may select specific triggering condition(s) from among the plurality of triggering conditions, and inform the selected specific triggering condition(s) to other communication nodes (e.g., transmitting terminal and/or receiving terminal). The base station may inform the selected specific triggering condition(s) to the transmitting terminal and/or the receiving terminal using higher layer signaling, control information, or a data channel. The transmitting terminal may inform specific triggering condition(s) to the receiving terminal using higher layer signaling or a sidelink channel (e.g., PSCCH (e.g., first-stage SCI), PSSCH (e.g., second-stage SCI)). According to a combination and/or extension of the above-described exemplary embodiments, a plurality of triggering conditions may be configured by higher layer signaling.

The base station or the transmitting terminal may select a plurality of triggering conditions from among the triggering conditions configured by higher layer signaling, and inform other communication nodes of the selected plurality of triggering conditions. In this case, even when one triggering condition among the plurality of selected triggering conditions is satisfied, the retransmission scheme may be switched. Alternatively, when all of the plurality of selected triggering conditions are satisfied, the retransmission scheme may be switched.

A single triggering condition may be configured by higher layer signaling. For example, each of the type 1 triggering condition and the type 2 triggering condition may include one triggering condition. In this case, the base station or the transmitting terminal may not perform an operation of selecting a triggering condition and an operation of transmitting the selected triggering condition.

When a preset time period elapses after the retransmission scheme switching, the retransmission scheme may be switched to the previous retransmission scheme.

FIG. 15 is a sequence chart illustrating a seventh exemplary embodiment of a retransmission scheme switching method in sidelink communication, and FIG. 16 is a sequence chart illustrating an eighth exemplary embodiment of a retransmission scheme switching method in sidelink communication.

As shown in FIG. 15 and FIG. 16, the communication system may include a transmitting terminal and a receiving terminal. The transmitting terminal may mean a terminal transmitting SL data, and the receiving terminal may mean a terminal receiving the SL data. For example, the transmitting terminal may be the UE 235 shown in FIG. 2 and the receiving terminal may be the UE 236 shown in FIG. 2. Each of the transmitting terminal and the receiving terminal may be configured identically or similarly to the communication node 300 shown in FIG. 3. Each of the transmitting terminal and the receiving terminal may support the protocol stacks shown in FIGS. 4 to 6.

Steps S1501 to S1503 in the exemplary embodiment shown in FIG. 15 may be performed identically or similarly to the steps S901 to S903 in the exemplary embodiment shown in FIG. 9. Steps S1601 to S1604 in the exemplary embodiment shown in FIG. 16 may be performed identically or similarly to the steps S1001 to S1004 in the exemplary embodiment shown in FIG. 10. In the exemplary embodiments shown in FIGS. 15 and 16, the HARQ retransmission scheme may be switched to the blind retransmission scheme, and the blind retransmission scheme may be switched back to the HARQ retransmission scheme. The transmitting terminal may switch the blind retransmission scheme to the HARQ transmission scheme when triggering condition(s) are satisfied. The receiving terminal may determine that the blind retransmission scheme is switched to the HARQ transmission scheme when the triggering condition(s) are satisfied. A retransmission procedure according to the HARQ retransmission scheme may be performed again after the retransmission procedure according to the blind retransmission scheme (S1504 and S1605).

When data is transmitted n times in the retransmission procedure according to the blind retransmission scheme, the retransmission scheme may be switched from the blind retransmission scheme to the HARQ retransmission scheme. n may be a threshold for the number of retransmissions of data, and may be a natural number. n may be set by higher layer signaling. For example, the base station may determine n and inform the transmitting terminal and/or the receiving terminal of n using higher layer signaling, control information, or a data channel. The transmitting terminal may receive n from the base station, and inform n to the receiving terminal using higher layer signaling or a sidelink channel (e.g., PSCCH (e.g., first-stage SCI), PSSCH (e.g., second-stage SCI)). Alternatively, n may be determined by the transmitting terminal. In this case, the transmitting terminal may inform the receiving terminal of n using higher layer signaling or a sidelink channel (e.g., PSCCH (e.g., first-stage SCI), PSSCH (e.g., second-stage SCI)). In addition, the transmitting terminal may transmit n determined by the transmitting terminal to the base station together with the switching report indicator in the step S1302 shown in FIG. 13. Alternatively, the transmitting terminal may transmit n determined by the transmitting terminal to the base station together with the switching request indicator in the step S1401 shown in FIG. 14. In the above-described exemplary embodiments, not only n but also information required for the blind retransmission scheme may be transmitted together.

FIG. 17 is a sequence chart illustrating a ninth exemplary embodiment of a retransmission scheme switching method in sidelink communication, and FIG. 18 is a sequence chart illustrating a tenth exemplary embodiment of a retransmission scheme switching method in sidelink communication.

As shown in FIG. 17 and FIG. 18, the communication system may include a transmitting terminal and a receiving terminal. The transmitting terminal may mean a terminal transmitting SL data, and the receiving terminal may mean a terminal receiving the SL data. For example, the transmitting terminal may be the UE 235 shown in FIG. 2 and the receiving terminal may be the UE 236 shown in FIG. 2. Each of the transmitting terminal and the receiving terminal may be configured identically or similarly to the communication node 300 shown in FIG. 3. Each of the transmitting terminal and the receiving terminal may support the protocol stacks shown in FIGS. 4 to 6.

Steps S1701 to S1704 in the exemplary embodiment shown in FIG. 17 may be performed identically or similarly to the steps S1101 to S1104 in the exemplary embodiment shown in FIG. 11. Steps S1801 to S1805 in the exemplary embodiment shown in FIG. 18 may be performed identically or similarly to the steps S1201 to S1205 in the exemplary embodiment shown in FIG. 12. In the exemplary embodiments shown in FIGS. 17 and 18, the blind retransmission scheme may be switched to the HARQ retransmission scheme, and the HARQ retransmission scheme may be switched back to the blind retransmission scheme. The transmitting terminal may switch the HARQ retransmission scheme to the blind transmission scheme when triggering condition(s) are satisfied. The receiving terminal may determine that the HARQ retransmission scheme is switched to the blind transmission scheme when the triggering condition (s) are satisfied. A retransmission procedure according to the blind retransmission scheme may be performed again after the retransmission procedure according to the HARQ retransmission scheme (S1806).

In the retransmission procedure according to the HARQ retransmission scheme, when more than n NACKs or DTXs for one data occur or when more than n NACKs or DTXs for multiple data occur, the retransmission scheme may be switched from the HARQ retransmission scheme to the blind retransmission scheme. n may be a natural number, and may be a threshold for the continuous NACKs or continuous DTXs. A criterion for the number of NACKs and/or the number of DTXs and information on n may be operated in the same manner as in the exemplary embodiment (s) according to the triggering condition(s). The above condition(s) and value(s) (e.g., n) may be configured by higher layer signaling.

The base station may determine the setting value (e.g., n). In this case, the base station may notify the transmitting terminal and/or the receiving terminal of n using higher layer signaling, control information, or a data channel. The transmitting terminal may receive n from the base station, and use higher layer signaling or a sidelink channel (e.g., PSCCH (e.g., first-stage SCI), PSSCH (e.g., second-stage SCI)) to inform n to the receiving terminal. Alternatively, n may be determined by the transmitting terminal. In this case, the transmitting terminal may inform the receiving terminal of n using higher layer signaling or a sidelink channel (e.g., PSCCH (e.g., first-stage SCI), PSSCH (e.g., second-stage SCI)).

In addition, the transmitting terminal may transmit n determined by the transmitting terminal to the base station together with the switching report indicator in the step S1302 shown in FIG. 13. Alternatively, the transmitting terminal may transmit n determined by the transmitting terminal to the base station together with the switching request indicator in the step S1401 shown in FIG. 14. In the above-described exemplary embodiments, not only n but also information required for the blind retransmission scheme may be transmitted together. When the triggering condition is not satisfied (e.g., when n or more NACKs or DTXs do not occur), the retransmission procedure according to the HARQ retransmission method may be performed without switching the retransmission scheme.

FIG. 19 is a sequence chart illustrating an eleventh exemplary embodiment of a retransmission scheme switching method in sidelink communication.

As shown in FIG. 19, the communication system may include a base station, a transmitting terminal, and a receiving terminal. The transmitting terminal may mean a terminal transmitting SL data, and the receiving terminal may mean a terminal receiving the SL data. For example, the transmitting terminal may be the UE 235 shown in FIG. 2, the receiving terminal may be the UE 236 shown in FIG. 2, and the base station may be the base station 210 shown in FIG. 2. Each of the base station, the transmitting terminal, and the receiving terminal may be configured identically or similarly to the communication node 300 shown in FIG. 3. Each of the transmitting terminal and the receiving terminal may support the protocol stacks shown in FIGS. 4 to 6.

The base station may determine switching of the retransmission scheme based on the above-described triggering condition(s). When it is determined that the retransmission scheme is switched, the base station may transmit a retransmission switching indicator indicating switching of the retransmission scheme to the transmitting terminal (S1901). The retransmission switching indicator may be transmitted from the base station to the transmitting terminal using higher layer signaling, control information, or a data channel. The transmitting terminal may receive the retransmission switching indicator from the base station, and may determine that the retransmission scheme switching is requested based on the retransmission switching indicator. The transmitting terminal transmits the retransmission switching indicator to the receiving terminal using higher layer signaling or a sidelink channel (e.g., PSCCH (e.g., first-stage SCI), PSSCH (e.g., second-stage SCI)) (S1902). The receiving terminal may receive the retransmission switching indicator from the transmitting terminal, and based on the retransmission switching indicator, the receiving terminal may determine that the retransmission scheme switching is requested. Thereafter, a retransmission scheme switching procedure between the transmitting terminal and the receiving terminal may be performed (S1903). The retransmission scheme switching procedure (e.g., step S1903) may be performed by one or more of the exemplary embodiments shown in FIGS. 9 to 12 and FIGS. 15 to 18, a combination of the above-described exemplary embodiments, or an extension of the above-described exemplary embodiments.

The retransmission switching indicator may be indicated using a higher layer message or sidelink channel (e.g., PSCCH (e.g., first-stage SCI), PSSCH (e.g., second-stage SCI)) transmitted first in the retransmission scheme switching procedure. In the exemplary embodiment shown in FIG. 19, the retransmission switching indicator may be the retransmission switching indicator in the exemplary embodiments shown in FIGS. 9 to 12, a combination of the above-described retransmission switching indicators, or an extension of the above-described retransmission switching indicators.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

The invention claimed is:

1. An operation method of a transmitting terminal in a communication system, the operation method comprising:
   transmitting, to a receiving terminal, first data based on a first retransmission scheme;
   in response to that a preconfigured condition is satisfied, switching a retransmission scheme from the first retransmission scheme to a second retransmission scheme; and
   transmitting, to the receiving terminal, second data based on the second retransmission scheme,
   wherein the first retransmission scheme and the second retransmission scheme are distinguished according to whether a hybrid automatic repeat request (HARQ) feedback is transmitted,
   wherein when the first retransmission scheme is a HARQ retransmission scheme, the second retransmission scheme is a blind retransmission scheme, and when the first retransmission scheme is the blind retransmission scheme, the second retransmission scheme is the HARQ retransmission scheme, and
   wherein when the HARQ retransmission scheme is used, the HARQ feedback is transmitted, and when the blind retransmission scheme is used, the HARQ feedback is not transmitted.

2. The operation method according to claim 1, wherein the preconfigured condition is configured from the base station through higher layer signaling.

3. The operation method according to claim 1, wherein a case in which the preconfigured condition is satisfied is a case when negative acknowledgment (NACK) for the first data occurs n or more times or a case when a channel state between the transmitting terminal and the receiving terminal satisfies a reference, n being a natural number.

4. The operation method according to claim 1, further comprising transmitting, to the receiving terminal, a first indicator indicating that the retransmission scheme is switched, wherein the transmitting of the second data is performed after transmission of the first indicator.

5. The operation method according to claim 4, wherein the first indicator is included in first-stage sidelink control information (SCI) or second-stage SCI transmitted from the transmitting terminal to the receiving terminal.

6. The operation method according to claim 1, further comprising, when the retransmission scheme is switched, transmitting, to the base station, a second indicator indicating that the retransmission scheme is switched.

7. The operation method according to claim 1, further comprising:
   transmitting, to the base station, a third indicator requesting switching of the retransmission scheme; and
   receiving, from the base station, a fourth indicator allowing switching of the retransmission scheme,
   wherein the retransmission scheme is switched when the fourth indicator is received.

8. The operation method according to claim 1, further comprising receiving, from a base station, a fifth indicator requesting switching of the retransmission scheme, wherein the retransmission scheme is switched when the fifth indicator is received.

9. The operation method according to claim 1, wherein the retransmission scheme is switched in unit of a transport block (TB), code block group (CBG), or HARQ process.

10. An operation method of a receiving terminal in a communication system, the operation method comprising:
    receiving, from a transmitting terminal, first data based on a first retransmission scheme;
    receiving, from the transmitting terminal, a first indicator indicating that a retransmission scheme is switched; and
    receiving, from the transmitting terminal, second data based on a second retransmission scheme,
    wherein the first retransmission scheme and the second retransmission scheme are distinguished according to whether a hybrid automatic repeat request (HARQ) feedback is transmitted,
    wherein when the first retransmission scheme is a HARQ retransmission scheme, the second retransmission scheme is a blind retransmission scheme, and when the first retransmission scheme is the blind retransmission scheme, the second retransmission scheme is the HARQ retransmission scheme, and
    wherein when the HARQ retransmission scheme is used, the HARQ feedback is transmitted, and when the blind retransmission scheme is used, the HARQ feedback is not transmitted.

11. The operation method according to claim 10, wherein the first indicator is included in first-stage sidelink control information (SCI) or second-stage SCI transmitted from the transmitting terminal to the receiving terminal.

12. The operation method according to claim 10, further comprising:
    in response to that a preconfigured condition is satisfied, determining that the second retransmission scheme is switched to the first retransmission scheme; and
    receiving, from the transmitting terminal, third data based on the first retransmission scheme.

13. The operation method according to claim 12, wherein the preconfigured condition is configured from the base station through higher layer signaling.

14. The operation method according to claim 12, wherein a case in which the preconfigured condition is satisfied is a case when negative acknowledgment (NACK) for the second data occurs n or more times or a case when a channel state between the transmitting terminal and the receiving terminal satisfies a reference, n being a natural number.

15. A transmitting terminal in a communication system, the transmitting terminal comprising:

a processor; and a memory storing one or more instructions executable by the processor, wherein the one or more instructions are executed to perform:

transmitting, to a receiving terminal, first data based on a first retransmission scheme;

in response to that a preconfigured condition is satisfied, switching a retransmission scheme from the first retransmission scheme to a second retransmission scheme; and transmitting, to the receiving terminal, second data based on the second retransmission scheme, wherein the first retransmission scheme and the second retransmission scheme are distinguished according to whether a hybrid automatic repeat request (HARQ) feedback is transmitted, wherein when the first retransmission scheme is a HARQ retransmission scheme, the second retransmission scheme is a blind retransmission scheme, and when the first retransmission scheme is the blind retransmission scheme, the second retransmission scheme is the HARQ retransmission scheme, and wherein when the HARQ retransmission scheme is used, the HARQ feedback is transmitted, and when the blind retransmission scheme is used, the HARQ feedback is not transmitted.

16. The transmitting terminal according to claim 15, wherein the first indicator is included in first-stage sidelink control information (SCI) or second-stage SCI transmitted from the transmitting terminal to the receiving terminal.

17. The transmitting terminal according to claim 15, wherein the one or more instructions are further executed to perform: when the retransmission scheme is switched, transmitting, to the base station, a second indicator indicating that the retransmission scheme is switched.

18. The transmitting terminal according to claim 15, wherein the one or more instructions are further executed to perform:

transmitting, to the base station, a third indicator requesting switching of the retransmission scheme; and receiving, from the base station, a fourth indicator allowing switching of the retransmission scheme, wherein the retransmission scheme is switched when the fourth indicator is received.

* * * * *